(12) United States Patent
Broadwin et al.

(10) Patent No.: US 6,275,989 B1
(45) Date of Patent: *Aug. 14, 2001

(54) INTERACTIVE TELEVISION SYSTEM AND METHOD FOR DISPLAYING WEB-LIKE STILLS WITH HYPERLINKS

(75) Inventors: Elliott Broadwin, Fremont; Jon C Haass, Belmont, both of CA (US)

(73) Assignee: Opentv, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/206,514

(22) Filed: Dec. 7, 1998

Related U.S. Application Data

(63) Continuation of application No. 08/675,636, filed on Jul. 1, 1996, now Pat. No. 5,903,816.

(51) Int. Cl.[7] .................................................. H04N 7/173
(52) U.S. Cl. ............................. 725/37; 725/110; 725/67; 725/68
(58) Field of Search ..................................... 348/7, 12, 13, 348/14, 473, 714; 455/4.2, 5.1; 345/327; 725/135, 138, 139, 141, 142, 134, 131, 114, 115, 116, 117, 87, 91, 100

(56) References Cited

U.S. PATENT DOCUMENTS

| | | | |
|---|---|---|---|
| 4,924,303 | * 5/1990 | Brandon et al. ........................ 348/7 |
| 5,027,400 | 6/1991 | Baji et al. . | |
| 5,594,509 | 1/1997 | Florin et al. . | |
| 5,689,799 | 11/1997 | Dougherty et al. . | |
| 5,818,441 | * 10/1998 | Throckmorton et al. .............. 348/13 |
| 5,903,816 | * 5/1999 | Broadwin et al. ..................... 455/3.1 |
| 5,929,850 | * 7/1999 | Broadwin et al. .................... 345/327 |
| 5,953,046 | * 9/1999 | Pocock ................................. 348/12 |

* cited by examiner

Primary Examiner—Chris Grant
(74) Attorney, Agent, or Firm—Conley, Rose & Tayon PC; Jeffrey C. Hood

(57) ABSTRACT

A system and method for displaying still video images related to video content in an interactive broadcast television system. The system and method of the present invention may also be used for simulating an Internet home page on an interactive television system. The present invention thus supports hyperlinked web-like navigational capabilities in an interactive television system. According to the method of the present invention, the video delivery system provides or broadcasts one or more audio/video channels each comprising video content and also provides or broadcasts at least one still image channel comprising a plurality of still video images, preferably MPEG-2 compressed still images. The user or viewer can select options displayed on the television screen to view desired information. When the set top box receives user input selecting an option to view one of the linked still images, the set top box captures the requested image from the still image broadcast channel, stores the image in memory, and displays the captured still video image corresponding to the selection. The still image being displayed may have associated interactive program content for displaying further selections, wherein these selections may be for viewing other images or content, for ordering information, or purchasing products. The user can thus selectively navigate between the video content and stills in a web-like hyperlinked fashion. In one embodiment, when a user is navigating through still images, the television program or video content which was being viewed is displayed in a small window overlaid on the still image being displayed. Also, when the set top box captures a requested image from the still image broadcast channel, the set top box preferably also pre-caches or pre-loads other related still images based on the probabilty that these related images will be subsequently requested by the user. The invention also includes an embodiment which provides user requested still images "on demand" on a dedicated "search" channel.

20 Claims, 19 Drawing Sheets

Fig. 15
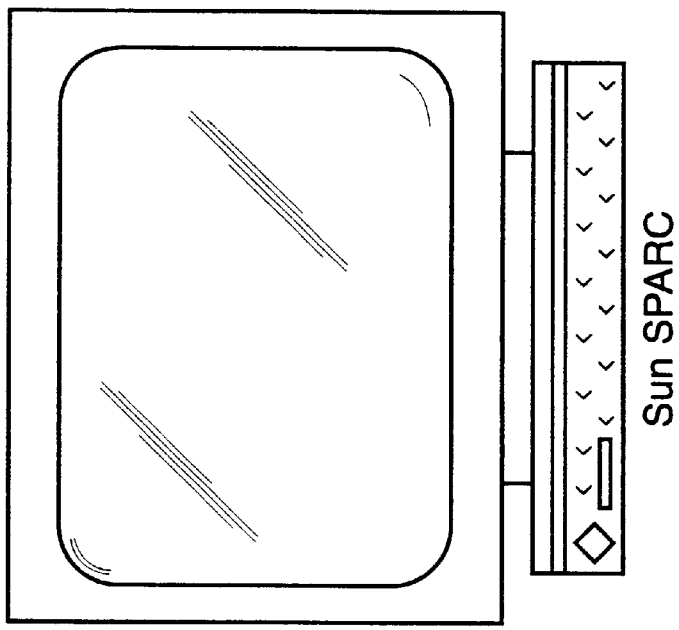
Sun SPARC
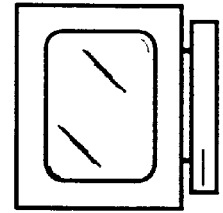
Sun SPARC
Optical Drive
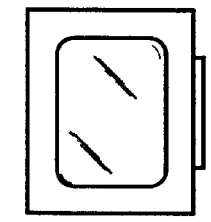
Monitor
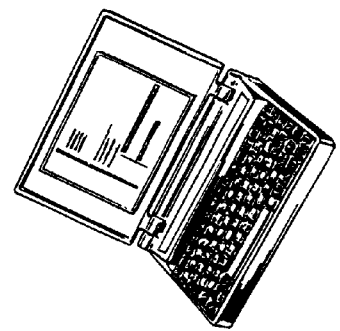
Laptop Computer
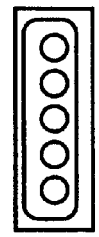
Modem

Fig. 16
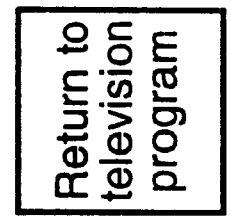
Return to television program
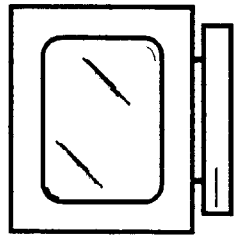
Sun SPARC
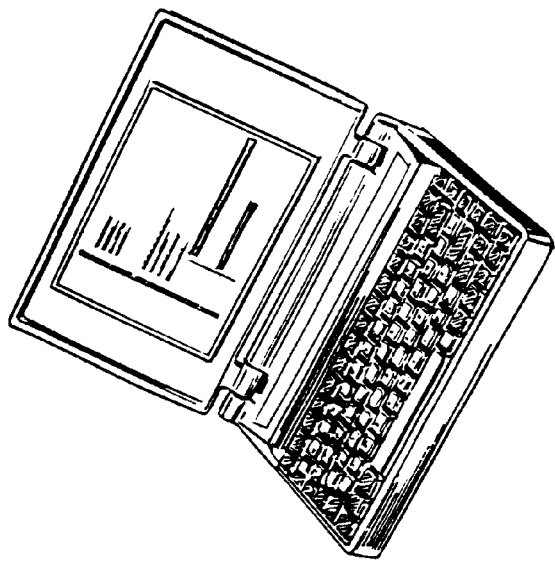
Laptop Computer
Optical Drive
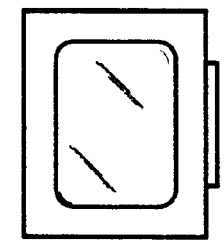
Monitor
Modem

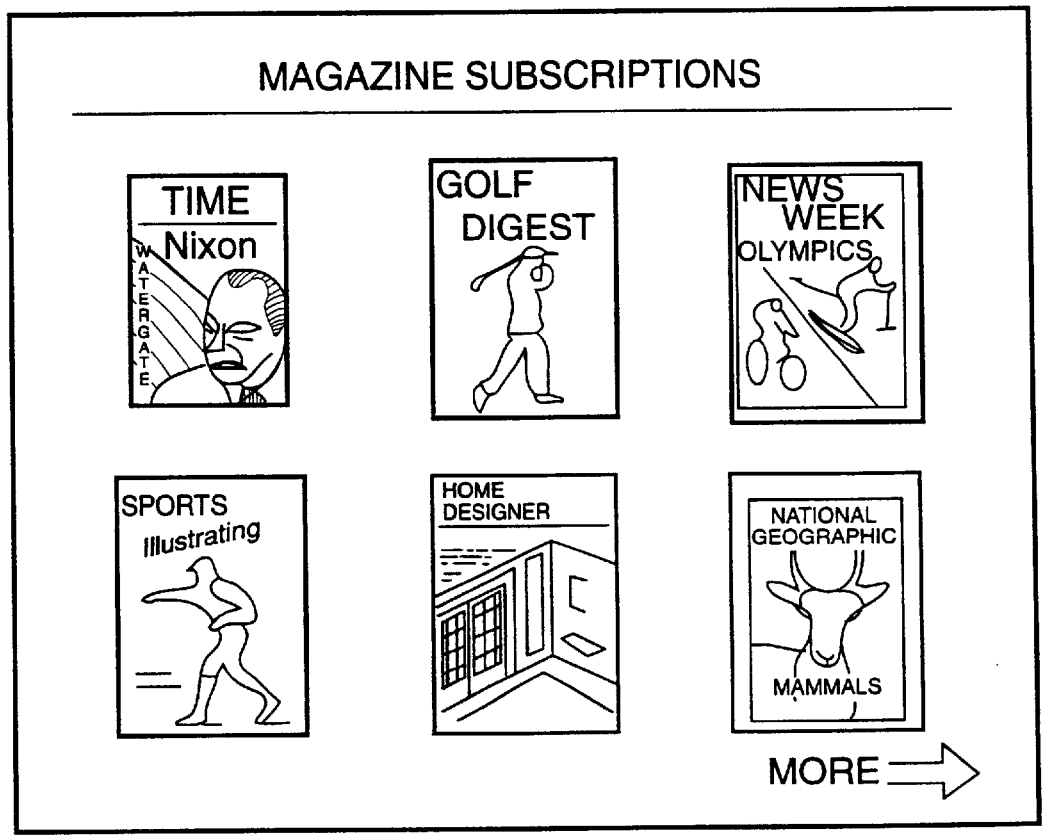

Direct TV Desktop
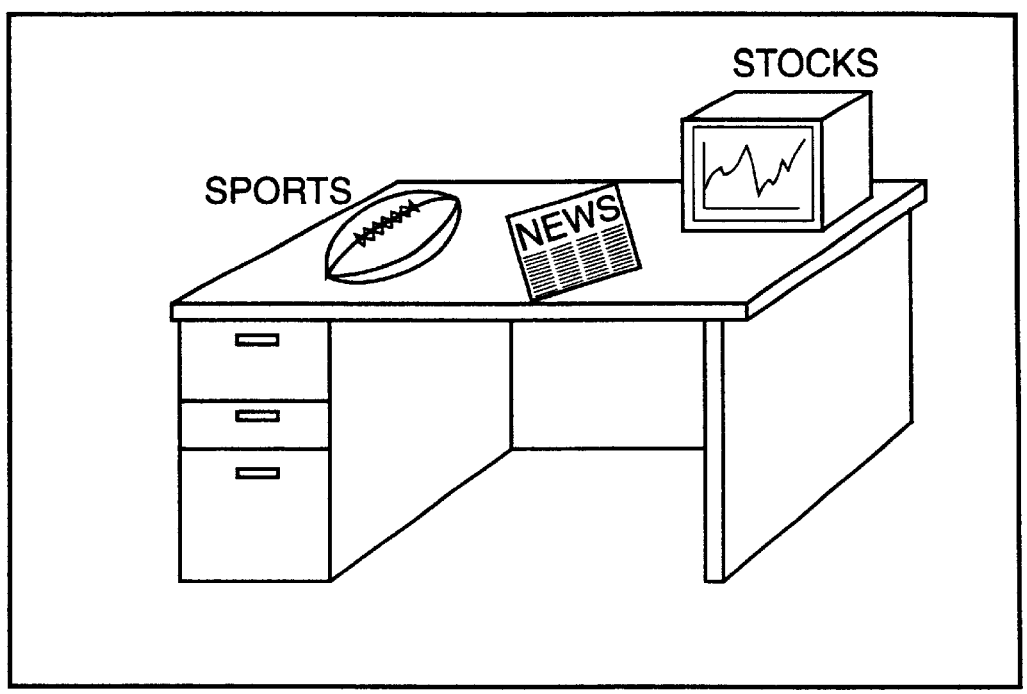
FIG. 21
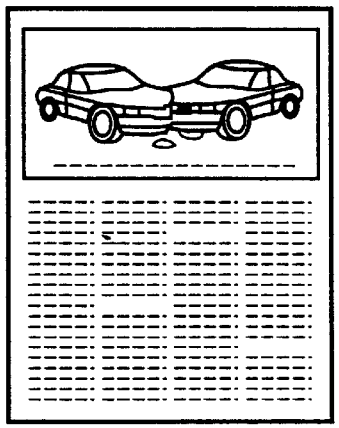
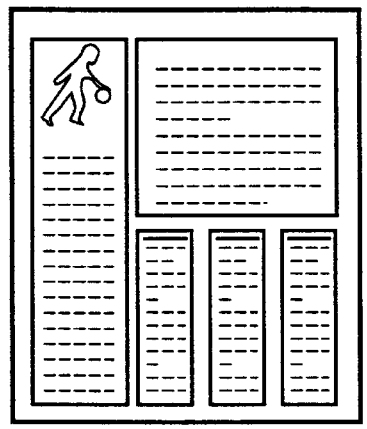
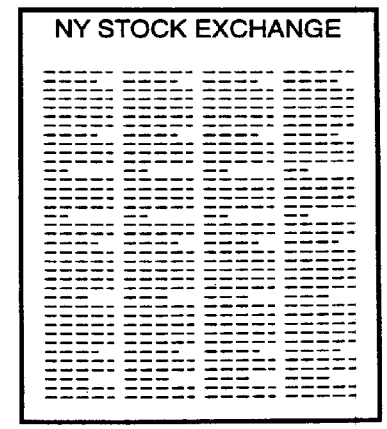
Fig. 22  Fig. 23  Fig. 24

INTERACTIVE TELEVISION SYSTEM AND METHOD FOR DISPLAYING WEB-LIKE STILLS WITH HYPERLINKS

This application is a continuation of U.S. patent application Ser. No. 08/675,636 filed on Jul. 1, 1996, which issued on May 11, 1999 as U.S. Pat. No. 5,903,816.

FIELD OF THE INVENTION

The present invention is related to interactive video delivery mediums such as interactive television, and more particularly to a system and method for generating and displaying hyperlinked web-like still video images in an interactive broadcast television system. The present invention is also related to a system and method for emulating Internet web pages in an interactive broadcast television system.

DESCRIPTION OF THE RELATED ART

The Internet is an international network based on various standard protocols and transfer mechanisms which supports thousands of computer networks. The basic transfer protocol used by the Internet is referred to as TCP/IP (Transfer Control Protocol/Internet Protocol), which was a transfer protocol originally used in the Unix operating system. The Internet essentially provides an interactive image and document presentation system which enables users to selectively access desired information and/or graphics content. The Internet has grown to form an information superhighway or information backbone with many and varied commercial uses.

The Internet includes various server types, including World Wide Web (WWW) servers which offer hypertext capabilities. Hypertext capabilities allow the Internet to link together a web of documents, which can be navigated using a convenient graphical user interface (GUI). WWW servers use Uniform Resource Locators (Ls) to identify documents, where a URL is the address of the document that is to be retrieved from a network server. The WWW, also referred to as the "web", also uses a hypertext language referred to as the hypertext mark-up language (HTML). A is a scripting or programming language which allows content providers or developers to place hyperlinks within web pages which link related content or data. The web also uses a transfer protocol referred to as HyperText Transfer Protocol (HTTP). When a user clicks on a link in a web document, the link icon in the document contains the URL which the client employs to initiate the session with the server storing the linked document. HTTP is the protocol used to support the information transfer.

Interactive television is an interactive audio/video delivery medium which provides broadcast audiovisual content to a number of subscribers. Interactive television provides broadcast video and audio to users and also provides a return path for the user to interact with the content, e.g, to make selections or order desired products, etc. Unlike the Internet, interactive television is primarily a broadcast medium which generally requires that the same audiovisual content be delivered to each user or subscriber.

One element of interactive television is the ability to provide electronic program guides and/or electronic catalogs which allow viewers to order programming or merchandise. An advertiser may advertise his product through interactive television, and the user may view and make selections to order the product or receive more information on the product.

It is clearly desired to provide a convenient and easy mechanism which enables a user or viewer in an interactive television system to more effectively select and view information with which the viewer is interested. For example, it is desired to provide a convenient advertising mechanism in an interactive broadcast television system which enables advertisers to more effectively display advertisements. It is more generally desired to enable the user or viewer to more conveniently navigate through information in a web-like fashion in an interactive television medium.

One problem in providing web-like capabilities in an interactive television system is the broadcast nature of the system. The Internet is essentially a multi-point to multi-point network where each user can selectively retrieve different information or view different selected content. In contrast, the broadcast television medium is primarily a point to multi-point network where every user is generally required to receive the same content. Therefore, an improved interactive television system and method is desired which provides web-like capabilities in a primary broadcast environment.

SUMMARY OF THE INVENTION

The present invention comprises a system and method for displaying still video images related to video content in an interactive broadcast television system. The present invention thus provides hyperlinked web-like capabilities in an interactive television system. The interactive television system comprises a video delivery system for providing a plurality of channels of video and/or image content, and at least one subscriber television including a display screen, wherein the subscriber television is coupled to the video delivery system. The subscriber television further includes a set top box or interactive decoder logic which receives the plurality of channels and selectively displays a channel based on user input.

According to the method of the present invention, the video delivery system provides or broadcasts one or more audio/video channels each comprising video content. The video delivery system also provides or broadcasts at least one still image channel comprising a plurality of still video images, preferably MPEG-2 compressed still images. One or more of the audio/video channels comprise AVI (audio video interactive) signals which include an audiovisual data stream as well as interactive program content. The interactive program content is executable to display selection options which reference or link to MPEG stills transferred on the still image channel. The MPEG stills may also include interactive program content used to display selection options which reference or link to other MPEG stills.

According to the invention, when the television is displaying video content from an AVI signal which includes interactive program content, the interactive program content is executed by the set top box or interactive decoder to display various selection options on the television. One or more of the selection options each corresponds to respective compressed still video images broadcast on the still image channel. The user or viewer can select one of the options to view desired information. When the set top box receives user input selecting an option to view one of the linked still images, the set top box captures the requested image from the still image broadcast channel, stores the image in memory, and displays the captured still video image corresponding to the selection. The still image being displayed may have associated interactive program content for displaying further selections, wherein these selections may be for viewing other images or content, for ordering information, or purchasing products. The user can thus selectively navigate between the video content and stills in a web-like hyperlinked fashion.

In one embodiment, when a user is navigating through still images, the television program or video content which was being viewed is displayed in a small window overlaid on the still image being displayed. In this embodiment, the audio portion of the program image may also be presented while still images are displayed. This provides a continuous television presence in addition to the web-like hyperlinked navigational capabilities.

When the set top box captures a requested image from the still image broadcast channel, the set top box preferably also preaches or pre-loads other related still images based on the probability that these related images will be subsequently requested by the user. Thus, when an image is requested that has been pre-cached, the image is retrieved from memory, instead of having to wait for the net broadcast of the image. This reduces the navigation latency and improves system performance.

In one embodiment, the interactive television system of the present invention further comprises a media server or web server which stores a plurality of still images which may be requested "on demand." In this embodiment, the broadcast center utilizes one or more channels which are reserved for user requests and thus provide still images "on demand." Thus, when the set top box receives user input indicating a request to receive additional still video images related to a certain video content, and these requested still images are not currently being broadcast on the still image channel, the set top box provides the request to the media server. The media server receives the request and provides the requested images to the broadcast center for transmission. The requested still video images related to the video content are then broadcast on the dedicated still image channel. The requesting set top box may then capture and display the requested images on the subscriber television. Alternatively, the requested images are provided directly from the media server to the set top box via the return channel.

The present invention thus comprises an interactive television system with web-like navigational capabilities. As one example, the present invention provides an improved system method for displaying advertising content in an interactive television system. A user viewing the television can select an option which displays the advertising content of a respective advertiser or vendor. When the user selects this option, the television hyperlinks to one or more high quality compressed video stills which are being broadcast on the dedicated one or more still image channels which display the advertiser's goods or services. In the preferred embodiment, the video stills are presented in a format similar to Internet pages. The still images may include thumbprint images which link to other stills. The user may select respective thumbprints to view a full-screen image of the thumbprint image. Still images may also include a selection which enables the user to order a product or to provide an indication that the user desires to receive more information. The present invention thus enables advertisers to more intuitively provide advertising content in an interactive television medium.

Therefore, the system and method of the present invention provides a more convenient and a more informative method for users or viewers to access or navigate information in an interactive broadcast television system. The present invention provides an improved method which enables users to navigate through information content in an interactive television system using web-like images and hyperlinks to simplify information selections.

BRIEF DESCRIPTION OF THE DRAWINGS

A better understanding of the present invention can be obtained when the following detailed description of the preferred embodiment is considered in conjunction with the following drawings, in which:

FIG. 15 illustrates a screen shot of a television displaying a program which includes selections that reference MPEG still images according to the present invention;

FIG. 16 illustrates an MPEG still image being displayed which includes one or more selections for viewing other stills or making orders according to the present invention;

FIG. 19 illustrates a magazine subscription example which utilizes linked images according to the present invention;

FIG. 20 illustrates a sweepstakes example which utilizes linked images according to the present invention; and FIGS. 21–24 illustrates a data feed application of the present invention.

DETAILED DESCRIPTION OF THE EMBODIMENTS

Interactive Television System

Figure 1:
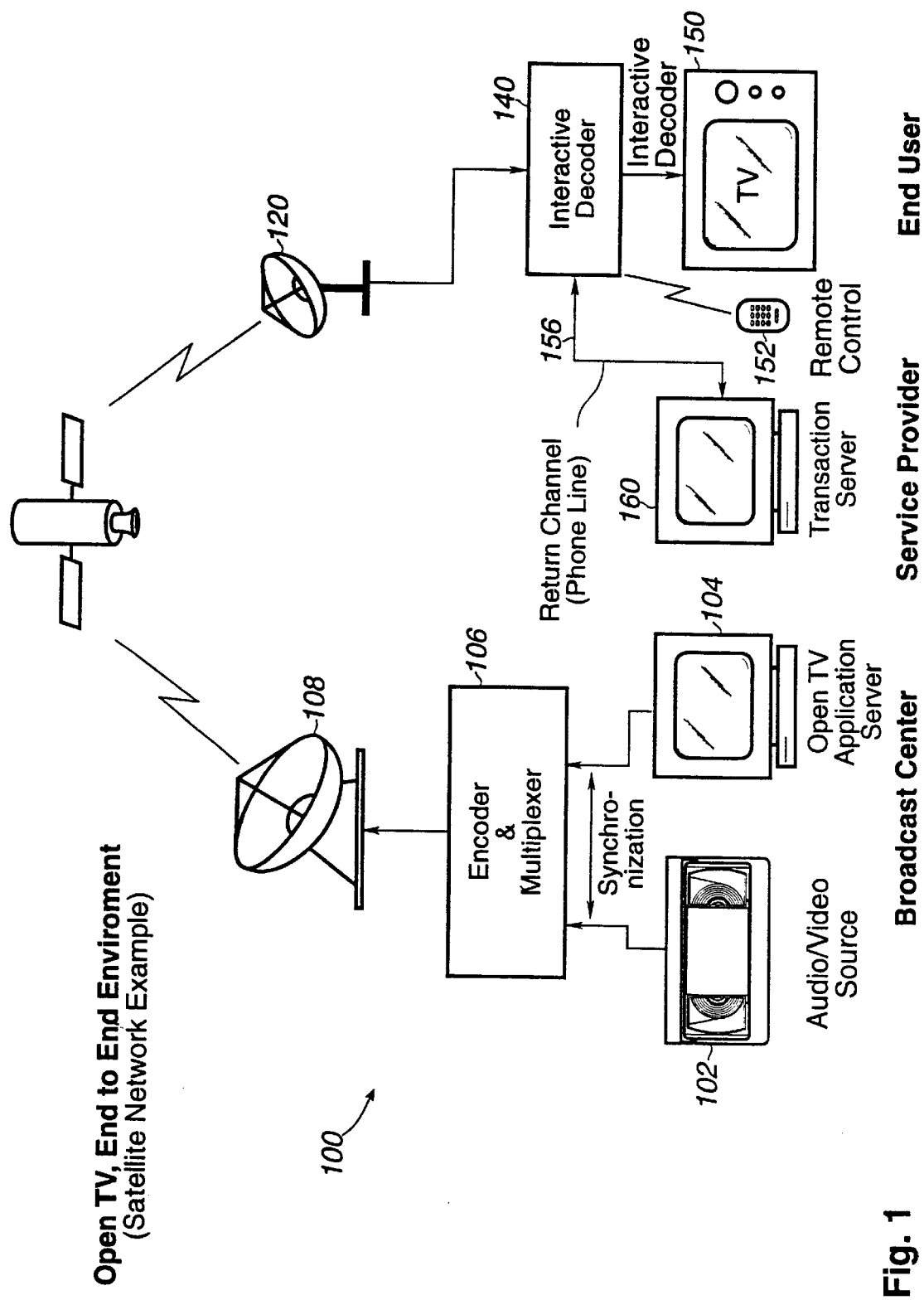
FIG. 1 illustrates an interactive television system according to the present invention.

Referring now to FIG. 1, a block diagram of an interactive television system according to one embodiment of the present invention is shown. It is noted that FIG. 1 is illustrative only, and other interactive television system embodiments may be used, as desired.

Figure 2:
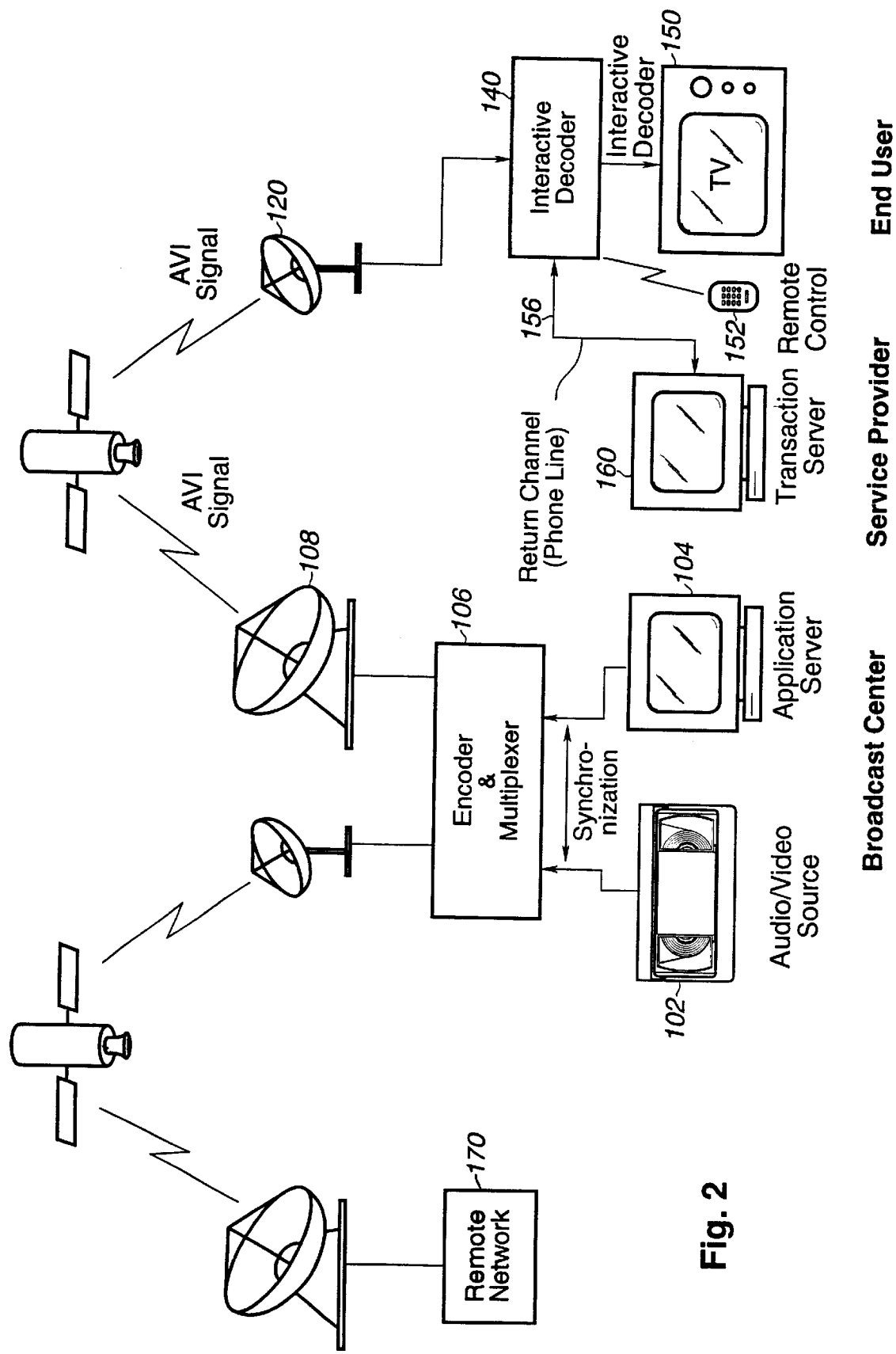
FIG. 2 illustrates the interactive television system of FIG. 1 which includes a remote network that provides programming content.

As shown, the interactive television system employs a broadcast center 100 for generating audiovisual content, including interactive audiovisual content. The broadcast center 100 includes an audio/video source 102 for providing the audiovisual content. The audiovisual content may comprise movies, sports, news, sitcoms or other audiovisual programming, as is normally seen on television. The audiovisual content also preferably comprises compressed still video images. The audio/video source 102 may include video compression logic for compressing still video images into compressed still video images. As shown in FIG. 2, the audiovisual content may also be supplied by a remote network 170 or a live feed, as desired.

The broadcast center 100 also includes an application server 104 for creating and/or generating interactive application content. The interactive application content comprises application code and data which is designed to be executed by a processor within a set top box or television to support an interactive television feature. The application server 104 is preferably configured for generating or providing "OpenTV" interactive applications. The application server may also provide "Java" applets or other interactive program content, as desired.

An Encoder/Multiplexer 106 combines the interactive application content with the audiovisual content to produce an audiovideo-interactive (AVI) signal. The Encoder/Multiplexer 106 also synchronizes the interactive application content with the audiovisual content to ensure that the interactive application content is inserted in the proper position within the audiovisual content. It is noted that certain channels may comprise non-interactive programming content. In other words, certain audiovisual content may not have associated interactive content. The Encoder/Multiplexer 106 preferably multiplexes a plurality of signals, including AVI signals and optionally non-interactive signals, together for transmission.

The broadcast center 100 also includes an uplink satellite 108 for transmitting the broadcast signal for receipt by end-users or a subsequent distribution link. It is noted that FIG. 1 illustrates a satellite network example where a satellite is used to transmit the broadcast signal. However, it is noted that other transmission methods may be used, including cable distribution through coaxial cable, fiber optic transmission, microwave transmission or other means.

The broadcast signal is received from broadcast center 100 via a satellite downlink 120. The broadcast signal is then provided to a plurality of subscribers. As noted above, the broadcast signal includes one or more AVI signals on respective channels, and may include one or more non-interactive program signals As shown, each end user or subscriber preferably includes a set top box or interactive decoder 140 as well as a television set 150. The set top box or interactive decoder 140 is coupled to the television set 150. It is noted that the interactive decoder logic may be comprised in the television 150 instead of being comprised as a separate unit 140. Also, the television may comprise a general purpose programmable computer having a display screen, or other viewing device, as desired.

In the present disclosure, the term "subscriber television" is intended to include the television set 150 or other viewing device, such as a computer, and may include associated decoder logic for executing interactive programs. For example, in one embodiment, the subscriber television comprises he television set 150 coupled with the interactive decoder or set top box 140.

The television 150 includes a remote control 152 which facilitates user interaction with the television 150 and/or interactive decoder 140. The user can select desired television channels for viewing. The signal on the selected television channel is decoded by the interactive decoder 140 which provides an output to the television set 150. The interactive decoder 140 preferably executes a real time operating system, such as OpenTV from Thomson Electronics. Where the channel being viewed comprises an AVI signal, the interactive decoder 140 also executes an interactive application program conveyed within the selected AVI signal to enable an enter active television feature.

A return channel 156 interconnects the interactive decoder 140 to a transaction server 160, which monitors certain selections by the user and responds accordingly, as desired. The return channel 156 preferably utilizes a standard POTS (plain old telephone system) phone line and associated modems (not shown) for communication. Other return channel options, such as coaxial cable, fiber optic cable, ADSL (Assymetric Digital Subscriber Line), ATM (Asynchronous Transfer Mode), or others, may be used, as desired.

The broadcast center 100 provides a plurality of program channels each comprising audiovisual content. One or more program channels comprise AVI signals including audiovisual content and associated interactive applications and/or still image link data. The link data is preferably HTML (hypertext markup language) data. According to the present invention, the broadcast center 100 also provides at least one channel, referred to as a still image channel, comprising a plurality of still video images, preferably MPEG compressed stills.

In the preferred embodiment, the still image channel transmits 25 still images per second where the images repeat every 3 seconds. Thus a total of 75 different still images are transmitted on one still image channel.

The interactive applications provided on a AVI signal are executable to display one or more selections on the television in conjunction with the audiovisual content. According to the present invention, certain of these selections reference respective MPEG stills which are transmitted on the one or more still image channels and are related to the video content. Certain selections may also be used to order information or products via the transaction server 160.

At least a subset of the broadcast still video images also include associated interactive application and/or link data which are executable to display one or more selections on the television in conjunction with the respective MPEG still. These selections may reference other MPEG stills, or may be used to order information or products. In one embodiment, one or more selections may be used to transmit a request to a media server for additional "on demand" MPEG stills.

Figure 3:
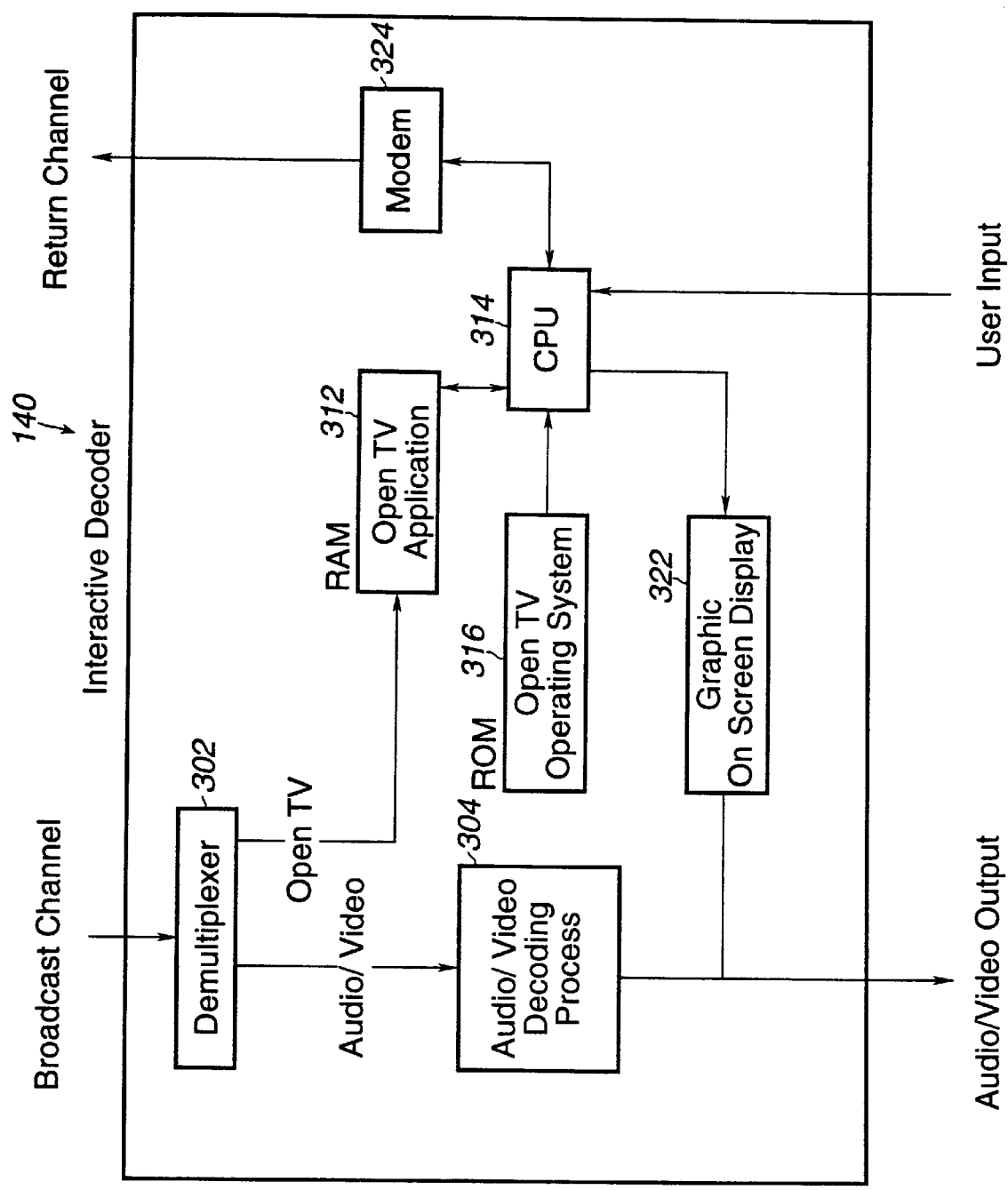
FIG. 3 is a block diagram of the interactive decoder of FIGS. 1 and 2.

FIG. 3—Interactive Decoder

Referring now to FIG. 3, a block diagram illustrating the interactive decoder 140 is shown. As shown, the interactive decoder 140 includes an input for receiving a broadcast signal over a channel. The broadcast signal preferably comprises a plurality of channels comprising program content, such as movies, sports, television shows, news, advertising, etc. At least a subset, ie, one or more, of the program channels comprises an AVI (audio video interactive) signal which comprises an audiovisual component as well as an interactive program component as described above.

The broadcast channel signal is provided to a demultiplexer 302 in the interactive decoder 140. The demultiplexer 302 operates to separate the audio/video component from the interactive component. In the preferred embodiment of the invention, the interactive component comprises an interactive application and/or data which is compliant with the OpenTV standard promulgated by Thomson Electronics. However, it is noted that other types of interactive applications may be included in the AVI signal, as desired.

The demultiplexer 302 provides the audio/video component to an audio/video decoding block 304. The decoding block 304 operates to decode the compressed audiovisual data stream to produce decompressed data. In the preferred embodiment, the broadcast channel torts MPEG-2 compressed data. Thus, in the preferred embodiment, the decoding process block 304 preferably includes an MPEG-2 decoder for decompressing or decoding the encoded data. The decoding process block 304 provides an audio/video output which is preferably provided to the television 150.

The interactive program component which is provided by the output of the demultiplexer 302 is provided to a memory 312, preferably a random access memory (RAM) which stores the interactive application, i.e., the OpenTV application. A CPU 314 is coupled to the interactive application RAM 312. Thus, the interactive application from the AVI signal is stored in the RAM 312, and the CPU 314 can read the application from the RAM 312 and execute the application. The interactive decoder 140 also preferably includes a second memory 316, preferably a read only memory (ROM), which stored the interactive application operating system. The operating system is preferably the OpenTV operating system from Thomson Electronics. The ROM 316 which stores the OpenTV operating system is also coupled to the CPU 314. Thus, the CPU 314 reads the OpenTV operating system from the ROM 316, whereby the operating system controls the operation of the CPU 314. The CPU 314 also reads the interactive application from the RAM 312, which was provided with the AVI signal, and executes this interactive application under control of the OpenTV operating system stored in ROM 316.

The CPU 314 provides an output to a graphic on-screen display block 322. The graphic on-screen display block 322 is coupled to provide an output in conjunction with the audio/video output provided by decoder 304. The graphic on-screen display block 322 organizes the data in a format which can be overlaid on top of the audio/video output of the decoder 304. Thus, the CPU 314 executes an interactive application and generates on-screen graphics which are provided in conjunction with the audio/video stream being output from the decoder 140. Thus, for example, if the interactive application is written to cause one or more selection options to be displayed or overlaid on top of a television program or still image, the CPU 314 executing the application provides the appropriate output to the graphic on-screen display block 322, and the block 322 causes the respective selection buttons to be overlaid on top of and/or displayed with the audio/video output of the decoder 304.

The interactive decoder 140 also includes an input for receiving user input. This user input is provided to an input of the CPU 314. This user input may be provided from various devices, preferably from remote control 152 or from buttons on the TV 150 or the interactive decoder 140. The user input provided to the CPU 314 enables a user to interact with the interactive application. For example, the user or viewer may choose a selection or button displayed on the screen to view a linked still image according to the present invention. The user or viewer may also choose a selection or button to order a product or order information, provide answers to a television game show, etc.

The interactive decoder 140 also includes a modem 324 which provides information on the return channel 156 for user interactivity. As shown in FIG. 3, the CPU 314 is coupled to the modem 324, and the modem 324 is coupled to a return channel output of the interactive decoder 140. In the embodiment shown in FIG. 3, the modem 324 may be used for bidirectional communication. As shown in FIG. 1, the return channel 156 preferably couples to a transaction server 160. Thus, if the user selects an option to order information, or purchase a product, the transaction server 160 receives this order and processes the order for fulfillment. In one embodiment, as discussed below with respect to FIG. 9, the return channel 156 is also coupled to a media server, and the return channel 156 is used to select additional MPEG still images for display which are provided "on demand", as described further below.

Figure 4:
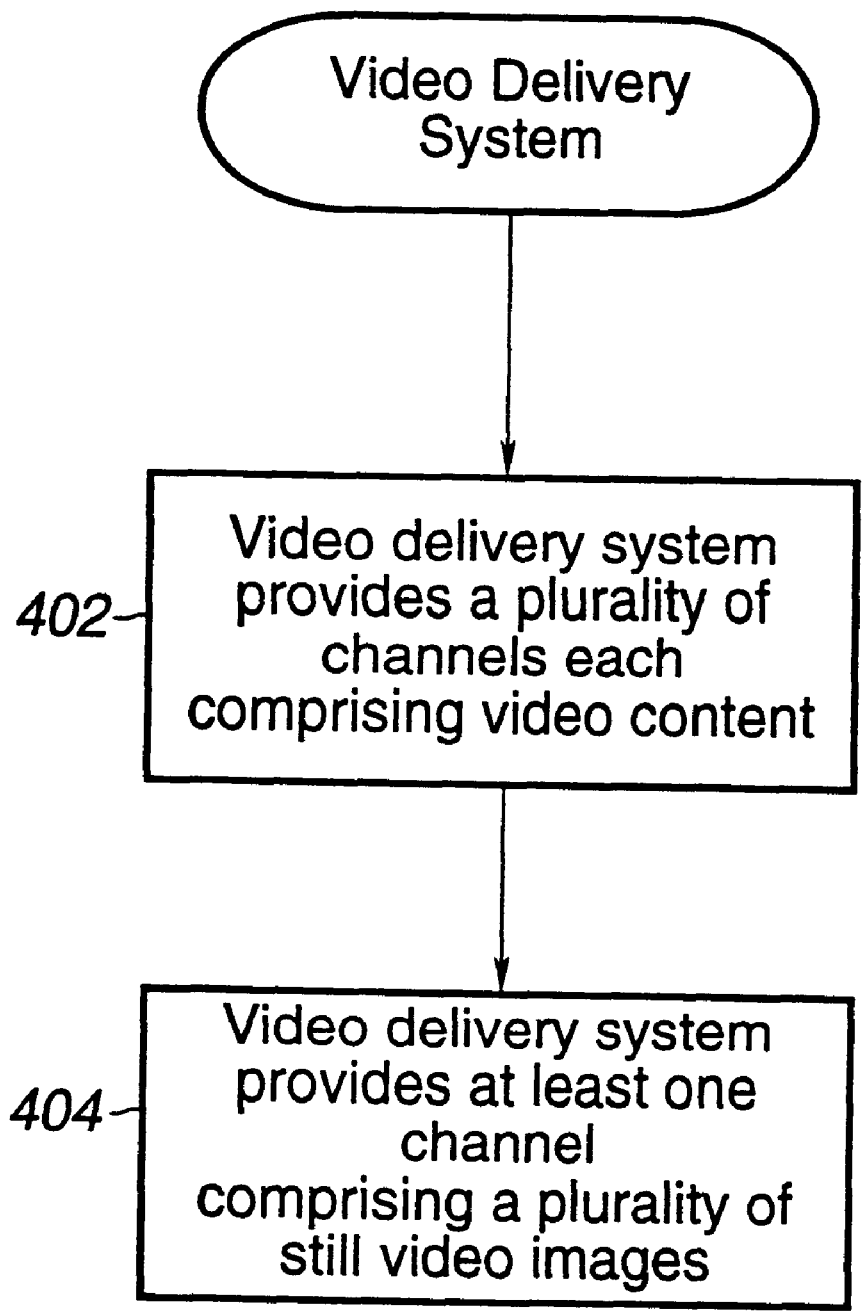
FIG. 4 is a flowchart diagram illustrating operation of the video delivery system of FIGS. 1 and 2.
Figure 5:
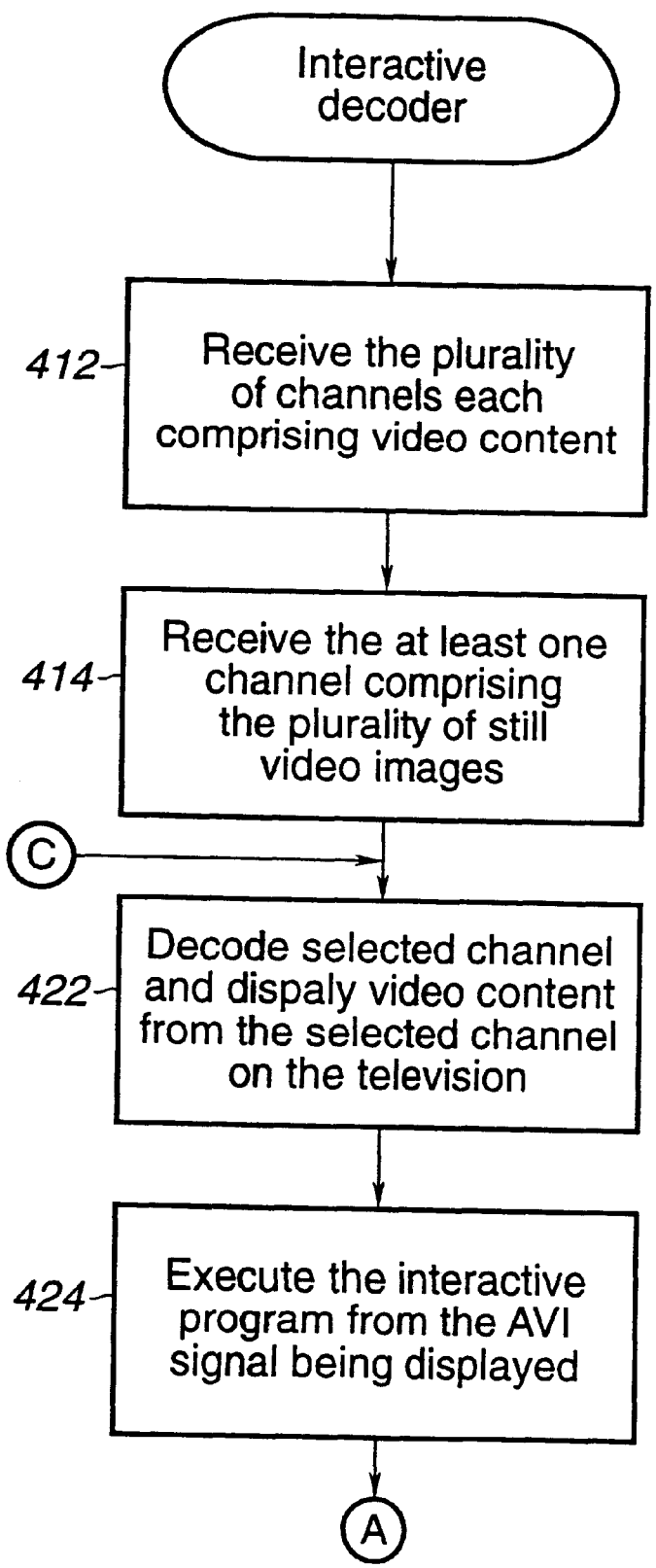
FIGS. 5 and 6 are flowchart diagrams illustrating operation of the interactive decoder of FIGS. 1 and 2 according to one embodiment of the present invention.
Figure 6:
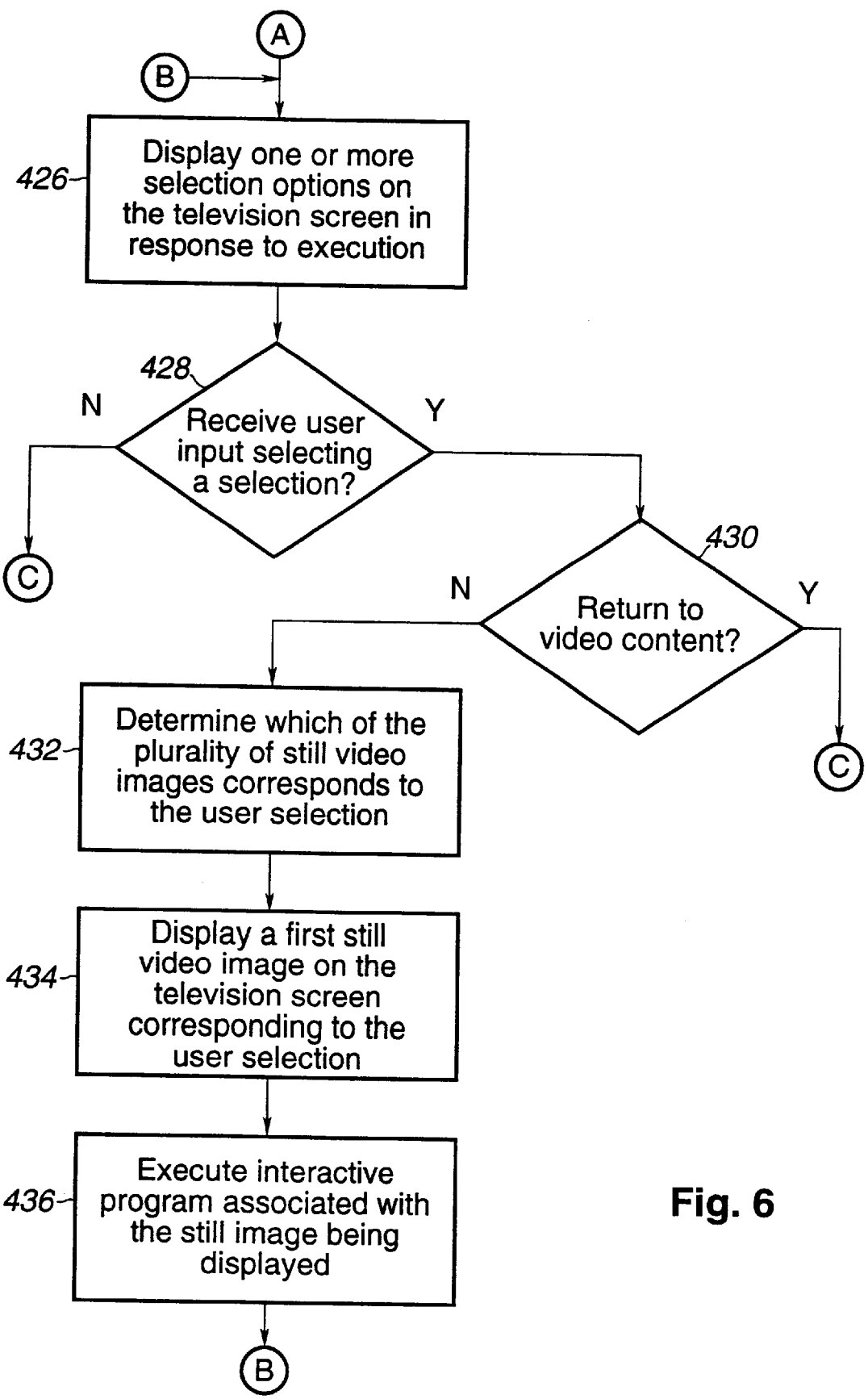

FIGS. 4–6: Interactive Television System

FIGS. 4–6 illustrate a method for displaying web-like still video images related to video content in an interactive television system according to the present invention. The method of the present invention provides hyperlinked web-like capabilities in an interactive television system. As shown in FIGS. 1 and 2, the interactive television system comprises a video delivery system or broadcast center 100 for providing video content, and at least one subscriber television 150 including a display screen, wherein the subscriber television is coupled to the video delivery system.

FIG. 4—Video Delivery System Flowchart Diagram

FIG. 4 is a flowchart diagram illustrating operation of the broadcast center of FIG. 1, also referred to as the video delivery system. As shown, in step 402 the video delivery system provides a plurality of program channels each comprising video content or audiovisual content. At least one of the plurality of channels comprises an AVI signal which includes an audiovisual signal as well as an interactive program included with the audiovisual signal. In step 404 the video delivery system 100 provides at least one channel comprising a plurality of still video images. This at least one channel is refereed to as a still image channel. As mentioned above, the still video images are preferably MPEG or MPEG-2 compressed stills. At least one of the plurality of still video images includes an interactive program associated with respective still. In the preferred embodiment, each of the still images includes a interactive program which displays a selection to ret to viewing the video content of the AVI signal. Each interactive program may also include other selections which reference other still images or other options. It is noted that the still image channel(s) comprising a plurality of still video images is a different channel from the plurality of program channels comprising audiovisual content. Also, it is noted that the video delivery system 100 provides the program channels in step 402 and the at least one still image channel in step 404 substantially simultaneously as a single broadcast, and the transmission of these channels is shown as separate steps for illustrative purpose.

FIGS. 5–6: Interactive Decoder Flowchart Diagram

Referring now to FIGS. 5–6, a flowchart diagram illustrating operation of the interactive decoder 140 according to the present invention is shown. In an embodiment where the interactive decoder logic is comprised in the television 150, the steps in FIGS. 5–6 are executed by the television 150. Although operation of the interactive decoder 140 is shown in FIGS. 5–6 in flowchart form, it is noted that certain of the steps may occur substantially simultaneously.

In step 412 the interactive decoder 140 receives the plurality of program channels each comprising video content. In step 414 the interactive decoder 140 receives the at least one channel comprising the plurality of still video images. In the preferred embodiment, the interactive decoder 140 receives the plurality of program channels each comprising video content in step 412 and the at least one channel comprising the plurality of still video images in step 414 substantially simultaneously from a broadcast network as a single broadcast transmission. It is also noted that the interactive decoder 140 receives the plurality of channels each comprising video content in step 412 and the at least one channel comprising the plurality of still video images in step 414 substantially continuously, i.e., as a continuous broadcast transmission.

The broadcast network is preferably a satellite broadcast network. Examples of satellite broadcast networks include "DirecTV", among others. The interactive decoder 140 may also receive these channels from other types of broadcast or point to multi-point networks, including a cable distribution system or microwave networks.

In step 422 the interactive decoder 140 decodes a selected channel and displays the audiovisual content of the selected channel on the television 150. Thus in step 422 the subscriber television 150 displays video content from one of the channels based on a user channel selection. In other words, the user preferably uses the remote control 152 or presses a button on the television 150 to select a desired channel for viewing. In response to the user channel selection, in step 422 the interactive decoder 140 tunes to the respective channel, decodes or decompresses the MPEG compressed audiovisual stream, and displays the audio-video content from the selected channel on the subscriber television 150. The selected channel preferably comprises an AVI signal which includes an audiovisual stream, preferably an MPEG-2 compressed audiovisual stream, and interactive program content according to the present invention.

In step 424 the interactive decoder 140 receives the interactive program or content from the AVI signal being displayed and executes this interactive program. Execution of the interactive content causes the interactive decoder 140 to display one or more selection options on the television screen 150 in step 426 (FIG. 6). In step 426 the one or more selection options are displayed on the screen with the related video content. The one or more selection options are preferably overlaid on top of the video content currently being displayed. At least a subset of the one or more selection options preferably corresponds to respective still video images being transmitted in the still image channel. Also, in this embodiment, one of the selection options may be used for other interactive selections.

The still video images referenced by the interactive program are preferably related by subject matter to the audiovisual content being displayed which included the interactive program. In other words, if the video content being displayed relates to a first subject matter, then the still video images referenced by the selection options also relate to that subject matter.

For example, if the AVI signal comprises a commercial for a Sun SparcStation computer, then the interactive program displays selection options which reference MPEG stills of related products. FIG. 15 illustrates a television screen-shot of an advertisement for a Sun SparcStation which includes selection options that reference rejective MPEG still images according to the present invention. As shown in FIG. 15, these stills include a close-up of the Sun SparcStation as well as related products, including a modem, laptop computer, video monitor, and optical drive. The selection options in the embodiment of FIG. 15 are thumbprint images of the image that is referenced. Thus the one or more selection options are linked to a first set of still video images, wherein the first set of still video images have video content related to the subject matter of the audiovisual content being displayed. If the user selects an option, such as the laptop computer, then the laptop computer image is presented as shown in FIG. 16. This operation is discussed further below.

As another example, if the AVI signal comprises a commercial for Chevrolet trucks, then the interactive program displays selection options which reference MPEG stills of Chevrolet trucks or other vehicles.

Each of the selection options is linked to at least one of the still video images, preferably through a hyperlink. These links may be created, for example, by HTM (hypertext mark-up language) code in the interactive application transmitted in the AVI signal. Thus, when the user selects a selection option, preferably using the remote control 152, the interactive application executing on the interactive decoder 140 reads the appropriate link data or HTML data associated with the selection and retrieves the corresponding MPEG still for display.

Steps 422–426 repeat and/or are continuously executed until user input is received making a selection. It is noted that steps 424 and 426 art only executed if the signal on the selected channel is an AVI signal which includes interactive content. Also, if no user input is received within a certain period of time, the interactive program completes. Thus if no user input is received as determined in step 428, operation returns to step 422.

If user input is received in step 428, i.e, if the interactive decoder 140 receives user input selecting one of the selection options, then operation advances to step 430. In this case, no option is presented to return to the video content of the AVI signal, since the video content of the AVI signal is currently being viewed, and operation proceeds directly to step 432.

In step 432 the interactive decoder 140 determines which of the plurality of still video images corresponds to the user selection. As mentioned above, this involves the interactive application executing on the interactive decoder 140 examining link data or HTML data to determine which of the plurality of still video images corresponds to the user selection.

In step 434 the interactive decoder 140 displays a still video image on the television screen corresponding to the user selection. In step 434 the interactive decoder 140 captures the still image that is being broadcast on the still image channel, preferably stores the still image in memory, such as memory 312, and displays the still image on the television screen. Thus the still video image is displayed in response to step 432 determining that the respective still video image corresponds to the selection received from the user in step 424.

In one embodiment, the video program content of the AVI signal, i.e., the television content on the channel being watched, is displayed in an inset window of the still image displayed in step 434. In addition, or alternatively, the audio from the AVI signal or television program is presented with the still image. This allows a continuous television program presence to be maintained while the user is navigating through the web-like stills.

The respective still video image is display on the same channel that the user or viewer was previously watching. Thus, from the user's perspective, one or more selections appear during a certain audiovisual television program the user selects one of the selections, and a related or corresponding still image, referred to as a first still image, appears on the television on the same channel that the viewer was watching. As discussed above, the first still image is related to the subject matter of the television program which was being viewed when the selection was made. Also, an inset of the television program may be maintained, as described above.

It is noted that the first still video image displayed in step 434 also preferably includes an associated interactive program that is transmitted with the still video image. As shown, in step 436 the interactive program or content associated with the still image being displayed is executed by the interactive decoder 140. Execution of the interactive content again causes the interactive decoder 140 to display one or more selection options on the television screen 150 in step 426. The one or more selection options are displayed on the screen with the related MPEG still. The one or more selection options are preferably overlaid on top of the video content or still image currently being displayed.

One or more selection options preferably correspond to other related ones of the still video images being transmitted. At least one of the selection options may be used to return to watching the audiovisual component of the AVI signal, i.e., to return to watching the television program.

Referring again to the example of FIGS. 15 and 16, if the user selects the laptop image selection in FIG. 15, the laptop image is captured from the still image channel and displayed on the screen. As shown in FIG. 16, one or more selection options are presented with the still image. These selection options include other related ones of the still video images being transmitted. One of the selection options may be used to return to watching the audiovisual component of the AVI signal, i.e., to return to watching the television program.

If a user selection is received in step 428 which indicates a desire to return to viewing the video content of the AVI signal as determined in step 430, i.e., to return to watching the television program or commercial being presented, then the interactive decoder 140 returns to step 422. If the user selection indicates a desire to view another one of the MPEG stills, then operation advances to step 432, and the selected image is determined, captured from the broadcast, and displayed in steps 432 and 434. Also, any interactive content is executed in step 436.

Thus, after the interactive program content associated with the still image being displayed is executed by the interactive decoder 140 in step 436, then steps 426–436 repeat as described above. Thus one or more selections options are displayed in step 422, and the user may possibly view other still images, or may return to the television program that was being watched.

Figure 7:
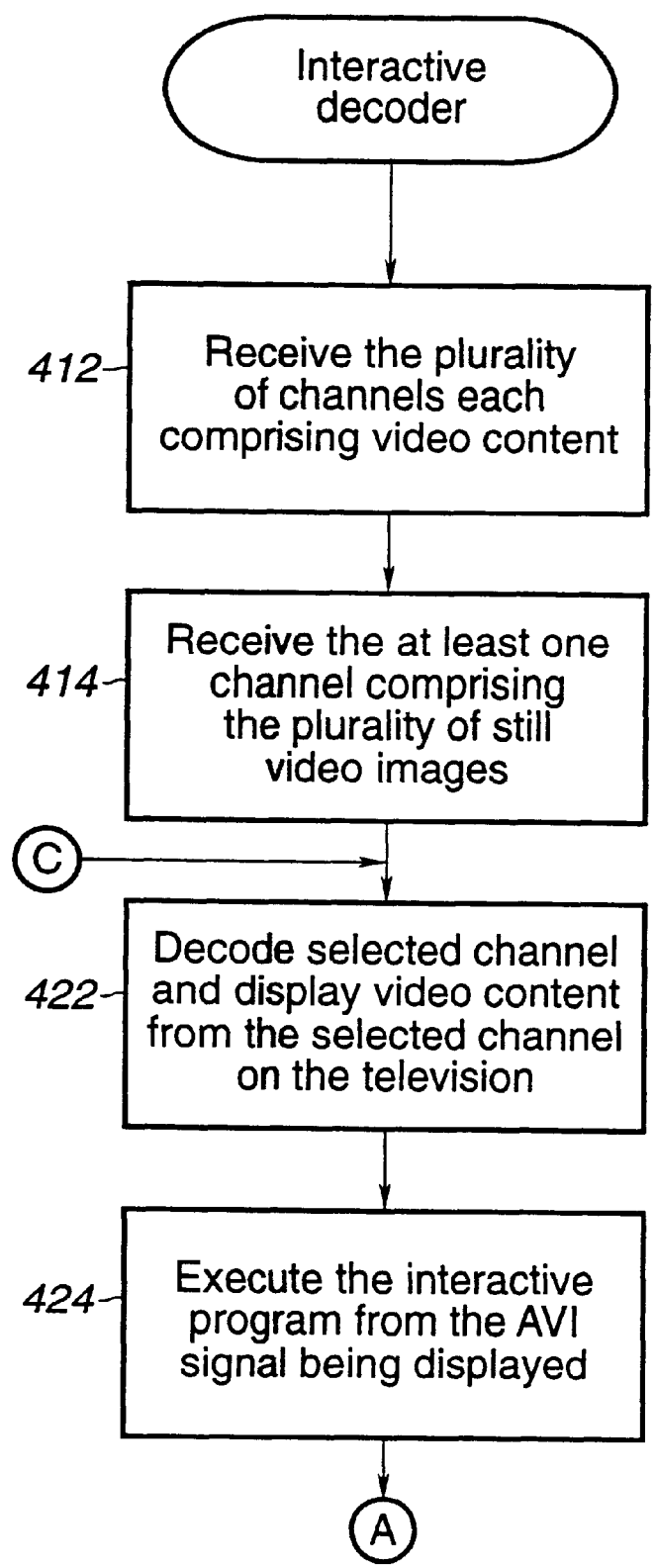
FIGS. 7–9 are a flowchart diagram illustrating operation of the interactive decoder of FIGS. 1 and 2 according to another embodiment of the present invention, wherein the interactive decoder pre-caches still images related to a selected still image for improved performance.
Figure 8:
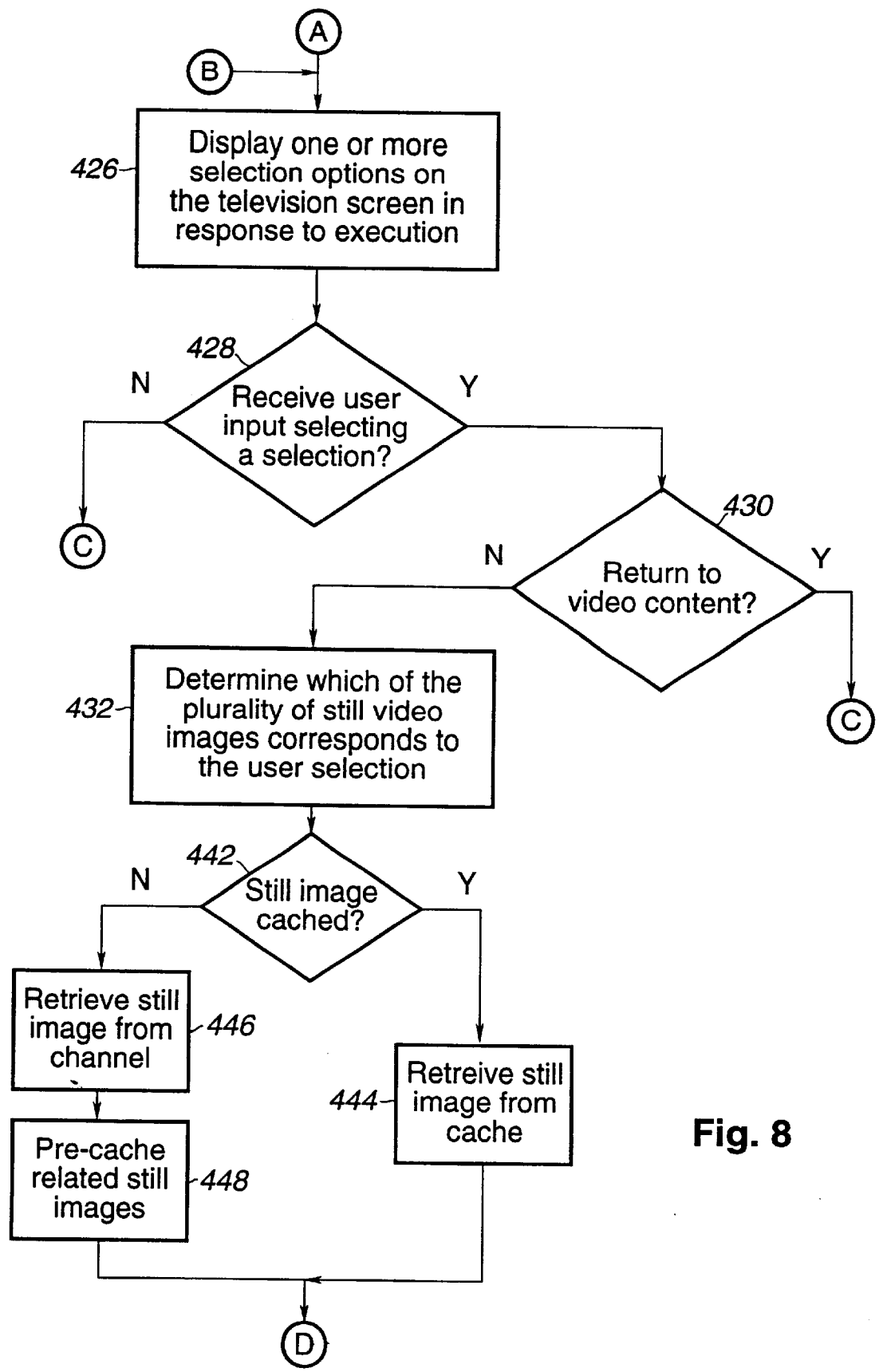
Figure 9:
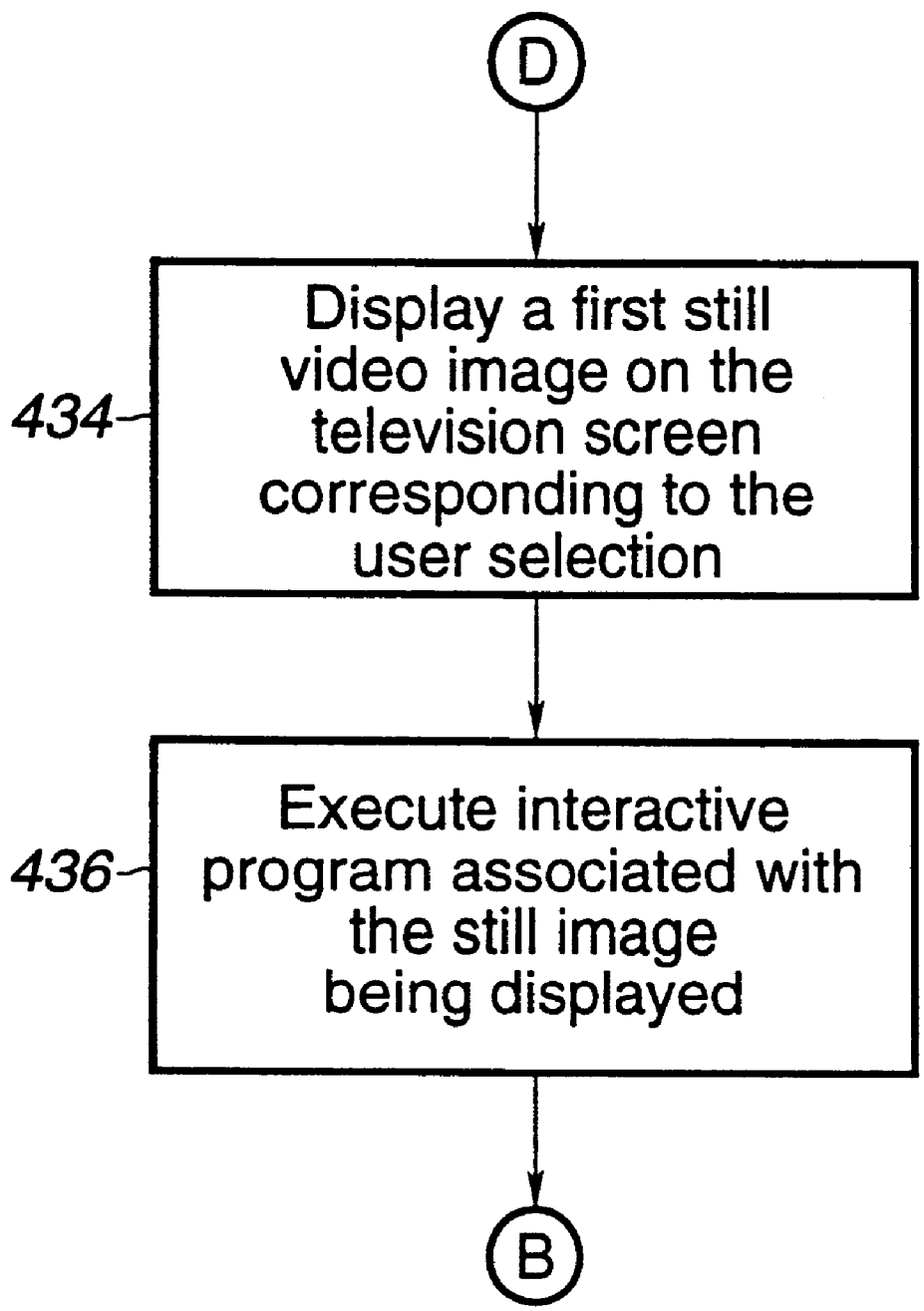

FIGS. 7–9: Precaching Embodiment

Referring now to FIGS. 7–9, a flowchart diagram illustrating operation of the interactive decoder 140 according to an alternate and preferred embodiment of the present invention is shown. The embodiment of FIGS. 7–9 is similar to the embodiment of FIGS. 5 and 6. However, in the embodiment of FIGS. 7–9, the interactive decoder 140 operates to pre-cache or pre-load still images which are related to a still image selected by the user to enable faster and more efficient display of these images should these images be subsequently requested by the user. As noted above with respect to FIGS. 5–6, the operation of the interactive decoder 140 is shown in FIGS. 7–9 in flowchart form, and it is noted that certain of the steps may occur substantially simultaneously.

In this embodiment, steps 412–432 of FIGS. 7 and 8 are performed in a substantially similar manner to steps 412–432 of FIGS. 5 and 6 as described above. However, as shown in FIG. 8, in step 432 after the interactive decoder 140 has determined which of the plurality of still video images corresponds to the user selection, in step 442 the interactive decoder 140 determines if the respective still image that has been requested is cached in the memory 312 of the interactive decoder 140. If the still image is determined to be cached in the interactive decoder 140, then in step 444 the interactive decoder 140 retrieves the still image from the memory, and operation advances to step 434 of FIG. 9.

If the still image is determined to not be cached in the memory 312 of the interactive decoder 140, then in step 446 the interactive decoder 140 retrieves the still image from the respective still image channel where the image is being transmitted by the broadcast network. This retrieved still image is stored in the memory 312 for display. In step 448 the interactive decoder 140 pre-caches or pre-loads other still images which are related to the still image selected by the user. These related still images are also preferably stored in the RAM 312 of the interactive decoder 140.

Thus, in the example of FIGS. 15 and 16 used above, if the user selects the laptop computer option in FIG. 15 to view the laptop still image as shown in FIG. 16, the interactive decoder 140 preferably stores or pre-caches the other respective MPEG still images, including the images of the Sun SparcStation, the modem, the video monitor, and the optical drive. Thus, if the user selects an option to view one of these other images, these images are already stored in memory and can be quickly retrieved. As another example, if the user is viewing a Chevrolet tuck commercial, and selects one of four possible images showing a Chevrolet truck, in this embodiment the interactive decoder 140 pre-caches or pre-loads the other three still images of Chevrolet trucks based on the assumption that the user will also subsequently desire to view these images. After the related images are stored in step 448, operation then advances to step 434 (FIG. 9).

In step 434 (FIG. 9), the interactive decoder 140 displays the still video image on the television screen. In step 434, the interactive decoder 140 captures the selected still image that is being broadcast on the still image channel, preferably stores the still image in memory, such as memory 312, and displays the still image on the television screen. If the still image includes an interactive program, then in step 436 the interactive decoder 140 executes the interactive program associated with the still image as previously described. Operation then returns to step 426 as previously described.

Therefore, in this embodiment the interactive decoder 140 operates to pre-cache or pre-load the still images which are related to a selected still image, based on the likelihood that the user will subsequently request these cached still images. This enables the interactive decoder 140 to provide these images much more quickly, thus reducing latency and providing greats responsiveness.

Figure 10:
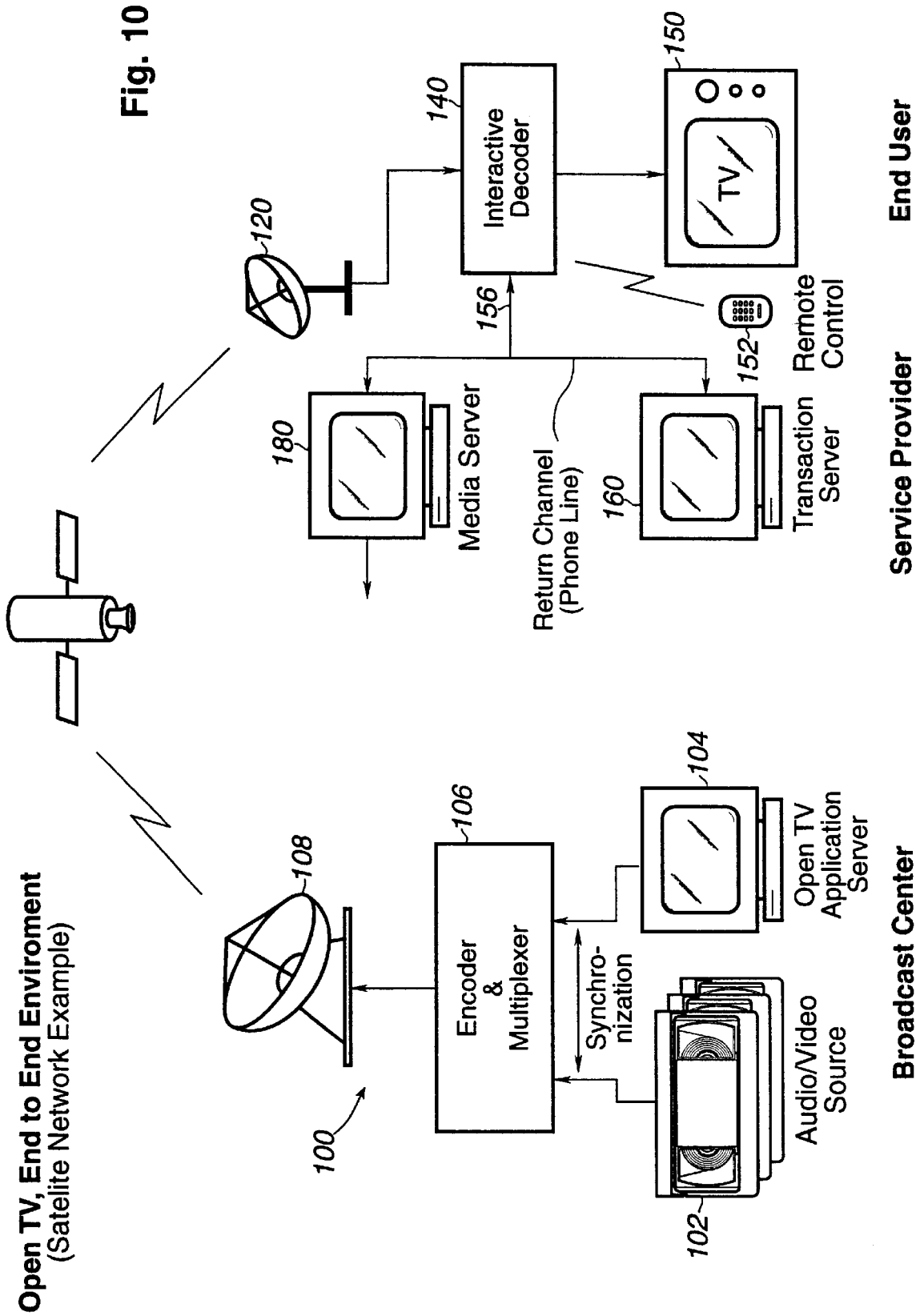
FIG. 10 illustrates an interactive television system which provides "on demand" still images according to the present invention.

FIG. 10—Interactive Television System with Media Server

Referring now to FIG. 10, a diagram illustrating an interactive television system and including a media server 180 according to another embodiment of the present invention is shown FIG. 10 is similar to FIG. 1, and elements in FIG. 10 which are similar or identical to elements in FIG. 1 have the same reference numerals for convenience.

As shown, FIG. 10 is similar to FIG. 1 except that the embodiment of FIG. 10 includes a media server 180 which is coupled to the return channel 156 of the interactive decoder 140. In this embodiment, when the user has viewed all of the available MPEG stills related to a certain subject matter that are being broadcast from the broadcast center 100, and the user desires to view further stills and/or obtain other information, the user can select an option which causes a request to be made for further stills or information "on demand". In this embodiment, when the user requests further information, the request is provided from the interactive decoder 140 to media server 180.

In one embodiment, the media server 180 provides the requested still images to the broadcast center 100, and the broadcast center 100 broadcasts the desired stills on a predesignated channel reserved for user requests, referred to as the search channel. It is noted that the user requests are only made once the user has exhausted all other available MPEG stills. Thus, in this embodiment, it is presumed that the vast majority of users will be satisfied with the MPEG stills that are being broadcast on the regular MPEG still broadcast channel. However, for those small number of users who desire more information, these users can make a request which is provided to the media server 180, and additional MPEG stills are provided by the broadcast center 100 "on demand" on the predefined search channel.

In another embodiment of the present invention, when the interactive decoder 140 transmits a request to the media server 180 for additional MPEG stills, the media server 180 provides these additional stills back through the return channel 156 to the interactive decoder 140, instead of providing the request to the broadcast center 100 for broadcast over the predefined channel. The modem 324 in the MPEG decoder 140 receives the requested still image, and the still image is stored in memory and provided through the decoder 304 for display on the television 150. Thus, in this embodiment, the media server 180 acts much like a web-server which receives the requests and provides the requested MPEG still directly to the interactive decoder 140 through the return channel 156. Thus, in this manner the media server 180 provides the desired MPEG stills directly to the interactive decoder 140 of the requesting user, and the MPEG stills are not required to be broadcast on a special predefined channel reserved for this use.

FIGS. 11–14: Interactive Television System with Media Server

FIGS. 11–14 illustrate a method for displaying web-like still video images related to video content in an interactive television system with additional user request capabilities according to the present invention. The present invention thus provides hyperlinked, on demand, web-like capabilities in an interactive television system. The embodiment of FIGS. 11–14 is similar to the embodiment of FIGS. 4–6. However, this embodiment allows a user or viewer to request and receive additional still images, thus providing more web-like capabilities.

As shown in FIG. 10, the interactive television system of this embodiment comprises a video delivery system 100 for providing video content, and at least one subscriber television 150 including a display screen, wherein the subscriber television is coupled to the video delivery system. The interactive television system also comprises a media server or web server 180 for handling user requests.

Figure 11:
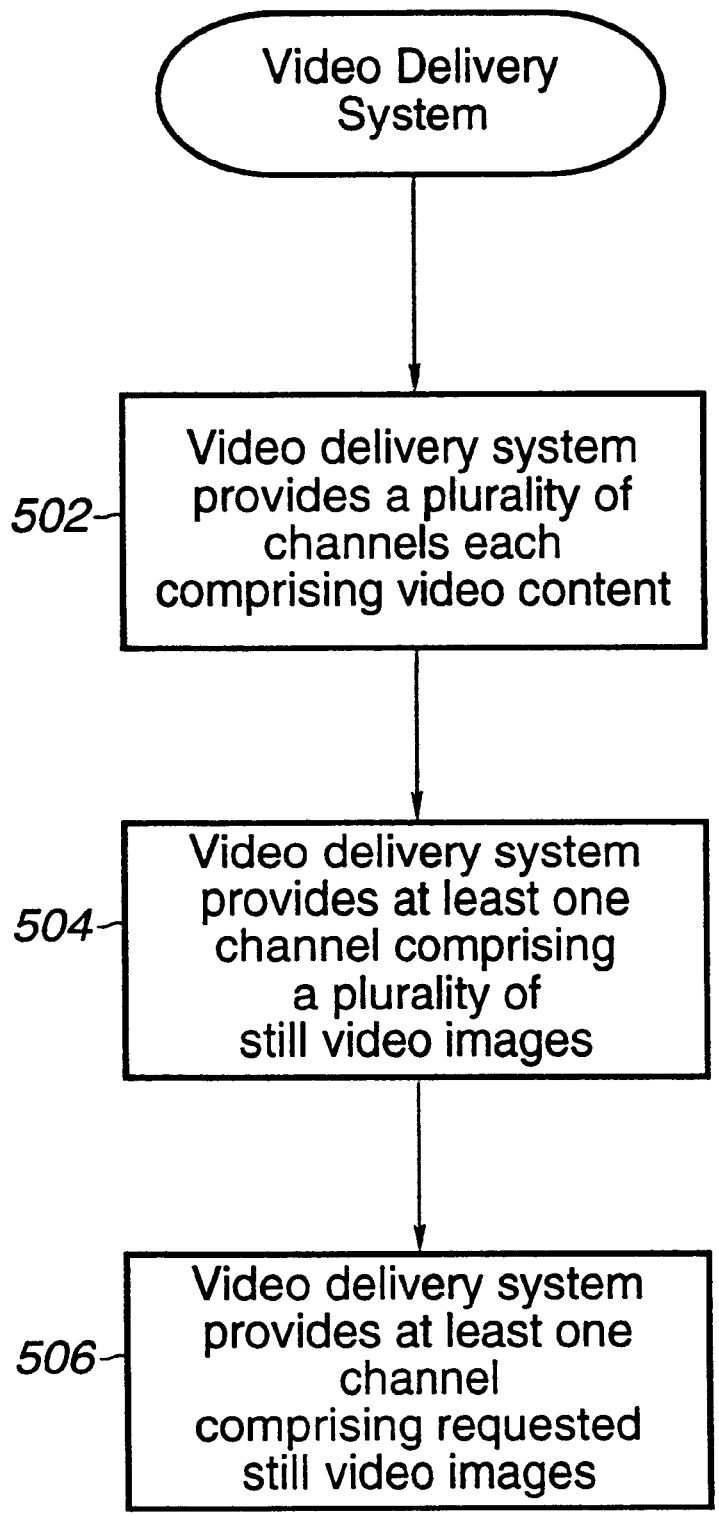
FIG. 11 is a flowchart diagram illustrating operation of the video delivery system of FIG. 10 according to the present invention.

FIG. 11–Video Delivery System Flowchart Diagram

FIG. 11 is a flowchart diagram illustrating operation of the broadcast center of FIG. 10, also referred to as the video delivery system. As shown, in step 502 the video delivery system provides a plurality of program channels each comprising video content or audiovisual content. At least one of the plurality of channels comprises an AVI signal which includes an audiovisual signal as well as an interactive program included with the audiovisual signal.

In step 504 the video delivery system 100 provides at least one channel comprising a plurality of still video images. This at least one channel is referred to as the still image channel. As mentioned above, the still video images are preferably MPEG or MPEG-2 compressed stills. At least one of the plurality of still video images includes an interactive program associated with the respective still. In the preferred embodiment, each of the still images includes an interactive program which displays a selection to return to viewing the video content of the AVI signal. Each interactive program may also include other selections which reference other still images or other options. It is noted that the still image channel(s) comprising a plurality of still video images is different from the plurality of program channels comprising audiovisual content.

In step 506 the video delivery system provides at least one channel comprising a plurality of requested still video images, referred to as a search channel. The channel provided in step 506 comprises a search channel which is dedicated for providing MPEG still images "on demand", i.e., based on user's requests. It is noted that the video delivery system 100 provides the program channels in step 502, the at least one still image channel in step 504, and the search channel in step 506 as a single broadcast, and the transmission of these channels is shown as separate steps for illustrative purposes.

Figure 12:
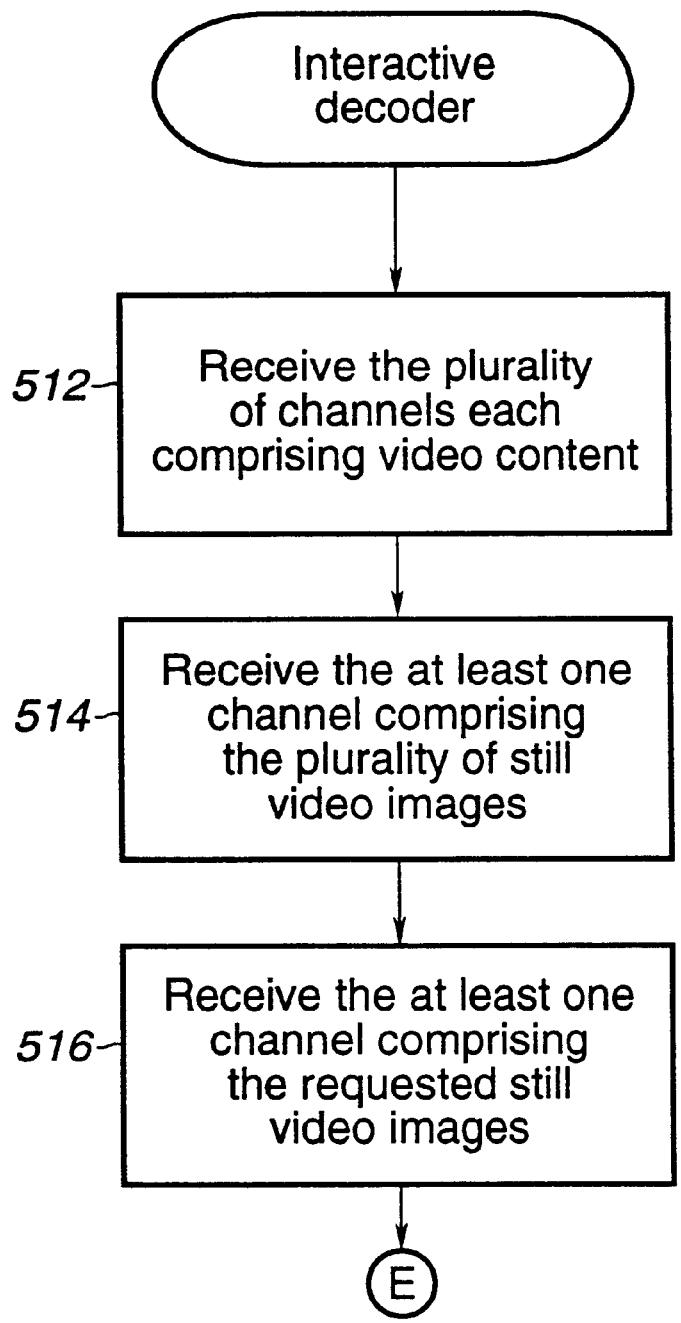
FIGS. 12–14 illustrate operation of the interactive decoder of FIG. 10 according to the present invention.
Figure 13:
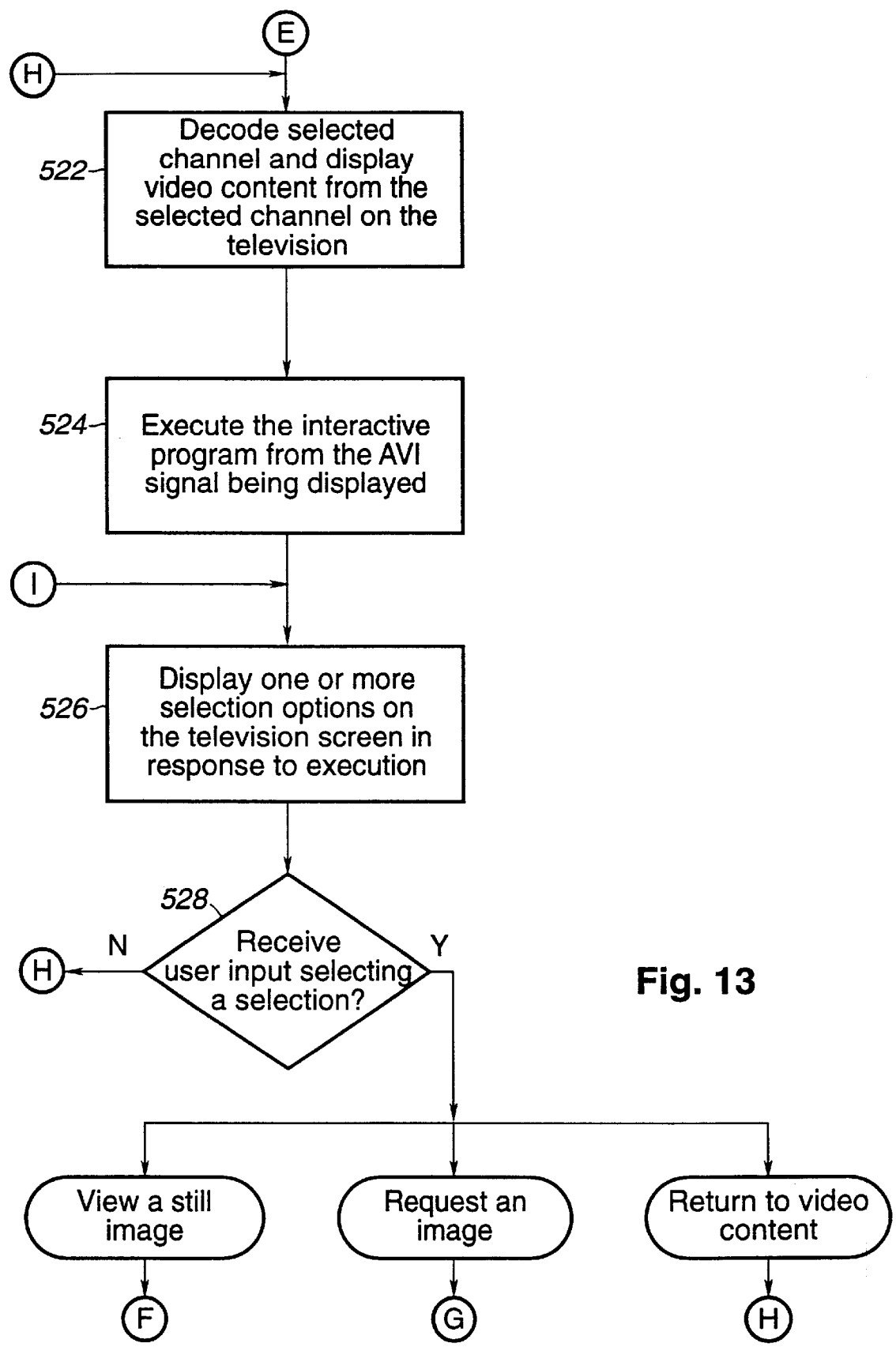
Figure 14:
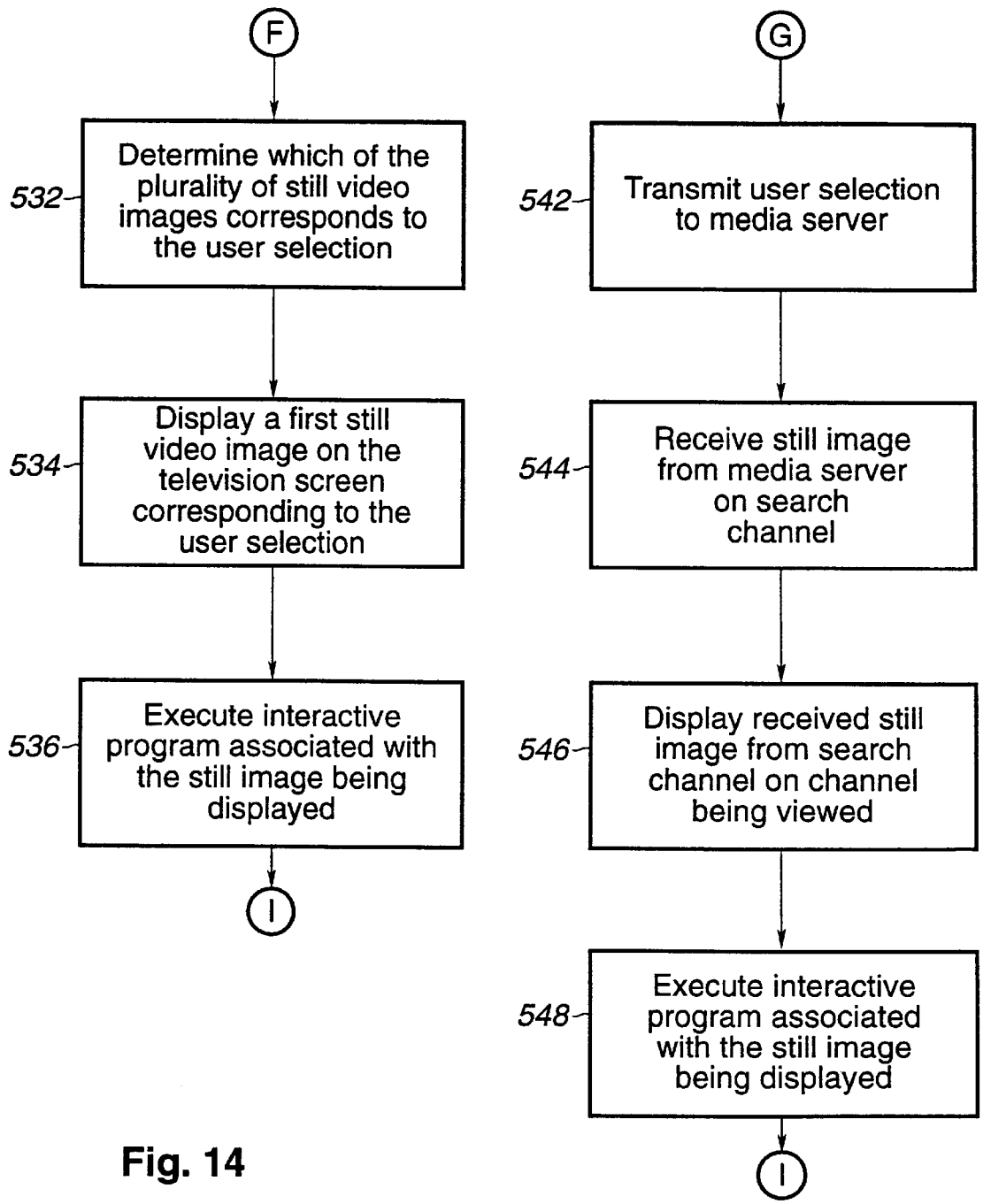

FIGS. 12–14: Interactive Decoder Flowchart Diagram

Referring now to FIGS. 12–14, a flowchart diagram illustrating operation of the interactive decoder 140 according to the present invention is shown. In an embodiment where the interactive decoder logic is comprised in the television 150, the steps in FIGS. 12–14 are executed by the television 150. Although operation of the interactive decoder 140 is shown in FIGS. 12–14 in flowchart form, it is noted that certain of the steps may occur substantially simultaneously.

In step 512 the interactive decoder 140 receives the plurality of program channels each comprising video content. In step 514 the interactive decoder 140 receives the at least one still image channel comprising the plurality of still video images. In step 516 the interactive decoder 140 receives the at least one search channel comprising the plurality of requested still video images. As noted above, the still images transferred on this latter search channel are provided "on demand" based on user's requests.

In the preferred embodiment, the interactive decoder 140 receives the plurality of channels each comprising video content in step 512, the at least one channel comprising the plurality of still video images in step 514, and the at least one channel comprising requested still images in step 516 substantially simultaneously from a broadcast network, such as a satellite broadcast network. Examples of satellite broadcast networks include "DirecTV", among others. The interactive decoder 140 may also receive these channels from other types of broadcast or point to multi-point networks, including a cable distribution system or microwave networks. It is also noted that the interactive decoder 140 receives the plurality of channels each comprising video content in step 512 and the channels comprising the plurality of still video images in steps 514 and 516 substantially continuously.

In step 522 (FIG. 13) the interactive decoder 140 decodes a selected channel and displays the audiovisual content of the selected channel on the television 150. Thus in step 522 the subscriber television 150 displays video content from one of the channels based on a user channel selection. In other words, the user preferably uses the remote control 152 or presses a button on the television 150 to select a desired channel for viewing. In response to the user channel selection, in step 522 the interactive decoder 140 tunes to the respective channel, decodes or decompresses the MPEG compressed audiovisual stream, and displays the audio-video content from the selected channel on the subscriber television 150. The selected channel preferably comprises an AVI signal which includes an audiovisual stream, preferably an MPEG-2 compressed audiovisual stream, and interactive program content according to the present invention In step 524 the interactive decoder 140 receives the interactive program or content from the AVI signal being displayed and executes this interactive program. Execution of the interactive content causes the interactive decoder 140 to display one or more selection in options on the television screen 150 in step 526. In step 526 the one or more selection options are displayed on the screen with the related video content. The one or more selection options are preferably overlaid on top of the video content currently being displayed, as shown in the example of FIG. 15. At least a subset of the one or more selection options preferably corresponds to respective still video images being transmitted on the illustrates image channel.

As described above, the still video images referenced by the interactive program are preferably related by subject matter to the audiovisual content being displayed which included the interactive program. In other words, if the video content being displayed relates to a first subject matter, then the still video images referenced by the selection options also relate to that subject matter.

Each of the selection options is linked to at least one of the still video images, preferably through a hyperlink. These links may be created, for example, by HTML hypertext make-up language) code in the interactive application transmitted in the AVI signal. Thus, when the user selects a selection option, preferably using the remote control 152, the interactive application executing on the interactive decoder 140 reads the appropriate link data or HTM data associated with the selection and retrieves the corresponding MPEG still for display.

Steps 522–526 repeat and/or are continuously executed until user input is received making a selection. It is noted that steps 524 and 526 are only executed if the signal on the selected channel is an AVI signal which includes interactive content. Also, if no user input is received within a certain period of time, the interactive program completes. Thus if no user input is received as determined in step 528, then operation returns to step 522.

If user input is received in step 528, i.e if he interactive decoder 140 receives user input selecting one of the selection options, then operation advances depending on whether the user desires to view an image custody being broadcast, the user requests more information and/or stills that are not custody being broadcast, or the user opts to return to viewing the television program. It is noted that, where the user is currently viewing a television program, i.e., the video content of the AVI signal, returning to view the television program is generally not an option.

If the user is currently viewing a still image and the selection indicates a desire to return to viewing the video content of the AVI signal, i.e., to return to watching the television program or commercial being presented, then the interactive decoder 140 returns step 522. If the user selection indicate a desire to view one of the MPEG stills currently being broads, then operation advances to step 532 (FIG. 14). If the user selection is a request to view one or more MPEG stills or other information that is not currently being broadcast, then operation advances to step 542 (FIG. 14).

If the user selection indicates a desire to view one of the MPEG stills currently being broadcast, in step 532 the interactive decoder 140 determines which of the plurality of still video images corresponds to the user selection. As mentioned above, this involves the interactive application executing on the interactive decoder 140 examining link data or HTML data to determine which of the plurality of still video images corresponds to the user selection. In step 534 the interactive decoder 140 displays a still video image on the television screen corresponding to the user selection. in step 534, the interactive decoder 140 captures the still image that is being broadcast on the still image channel, preferably stores the still image in memory, such as memory 312, and displays the still image on the television screen. Thus the still video image is displayed in response to step 532 determining that the respective still video image corresponds to the selection received from the user in step 528.

The respective still video image is displayed on the same channel that the user or viewer was previously watching. Thus, from the user's perspective, one or more selections appear during a certain audiovisual program, the user selects one of the selections, and a related or corresponding still image, referred to as a first still image, appears on the television on the same channel that the viewer was watching. As discussed above, the first still image is related to the subject matter of the television program which was being viewed when the selection was made.

It is noted that the still video image displayed in step 534 may also include an associated interactive program that is transmitted with the still video image. As shown, in step 536 the interactive program or content associated with the still image being displayed is executed by the interactive decoder 140. Execution of the interactive content again causes the interactive decoder 140 to display one or more selection options on the television screen 150 in step 526. The one or more selection options are displayed on the screen with the related MPEG still, as discussed above with respect to the example of FIG. 16. The one or more selection options are preferably overlaid on top of the video content or still image currently being displayed. At least one of the selection options may be used to return to watching the audiovisual component of the AVI signal, i.e., to return to watching the television program. One or more selection options preferably correspond to other ones of the still video images being transmitted.

After the interactive program content associated with the still image being displayed is executed by the interactive decoder 140 in step 536, then steps 526–528 repeat as described above. Thus one or more selections options are displayed in step 526, and the user may possibly view other still image request other images, or may return to the television program that was being watched.

If the user selection is a request to view one or more MPEG stills or other information that is not currently being broadcast, then operation advances to step 542 (FIG. 14). In step 542 the interactive decoder 140 transmits a user selection to the media server 180. The media server 180 preferably provides the requested still images to the broadcast center 100, and the broadcast center 100 broadcasts the desired stills on the pre-designated search channel reserved for user requests.

In step 544 the interactive decoder 140 receives one or more still images from the broadcast center 100 in response to the request made in step 542. The one or more still images from the broadcast center 100 are preferably provided on a search channel, which is a channel dedicated to "on demand" MPEG still images that are requested by users.

In step 546 the interactive decoder 140 displays the one or more requested still video images on the television screen corresponding to the user request. In step 546 the interactive decoder 140 captures the still image that is being broadcast on the search channel, preferably stores the still image in memory, such as memory 312, and displays the still image on the television screen. Thus the still video image is displayed in response to the user request in step 542.

The respective still video image is displayed on the same channel that the user or viewer was previously watching.

Thus, from the user's perspective, one or more selections appear during a certain audiovisual program, the user selects one of the selections, and a related or corresponding still image, referred to as a first still image, appears on the television on the same channel that the viewer was watching. As discussed above, the first still image is related to the subject matter of the television program which was being viewed when the selection was made.

It is noted that still video image displayed in step 546 may also include an associated interactive program that is transmitted with the still video image. As shown, in step 548 the interactive program or content associated with the still image being displayed is executed by the interactive decoder 140. Execution of the interactive content again causes the inactive decoder 140 to display one or more selection options on the television screen 150 in step 526. The one or more selection options are displayed on the screen with the related MPEG still, preferably overlaid as described above. At least one of the selection options may be used to return to watching the audiovisual component of the AVI signal, i.e., to return to watching the television program. One or more selection options preferably correspond to other ones of the still video images being transmitted.

After the interactive program content associated with the still image being displayed is executed by the interactive decoder 140 in step 548, then steps 526–528 repeat as described above. Thus one or more selections options are displayed in step 526, and the user may possibly view other still images, request new images be transmitted for viewing, or may return to the television program that was being watched.

FIG. 15—Television Program with User Selections

FIG. 15 illustrates a screen shot of a television program or commercial which includes various user selections for selecting still images according to the present invention. As shown, the selections are overlaid on top of the normal program. These selections may comprise thumbprint images which indicate the nature of the still image referenced, much like a web home page. The selections may also be used to order information or products.

Thus when the user is viewing a respective channel or respective advertising which includes interactive programming according the invention, the decoder 140 displays one or more user selection options which reference still images being broadcast These user selection options may take the form of thumbprint images.

FIG. 16—Still Image with User Selections

FIG. 16 illustrates a screen shot of a still image which includes various user selections. As shown, the selections are overlaid on top of the image. These user selections may be used for selecting other still images according to the present invention. As mentioned above, these selections may comprise thumbprint images which indicate the nature of the still image referenced, much like a web home page. The selections displayed with the still image may also be used to order information or products, return to viewing the television program, or otherwise interact with the image being displayed.

Figures 17, 18:
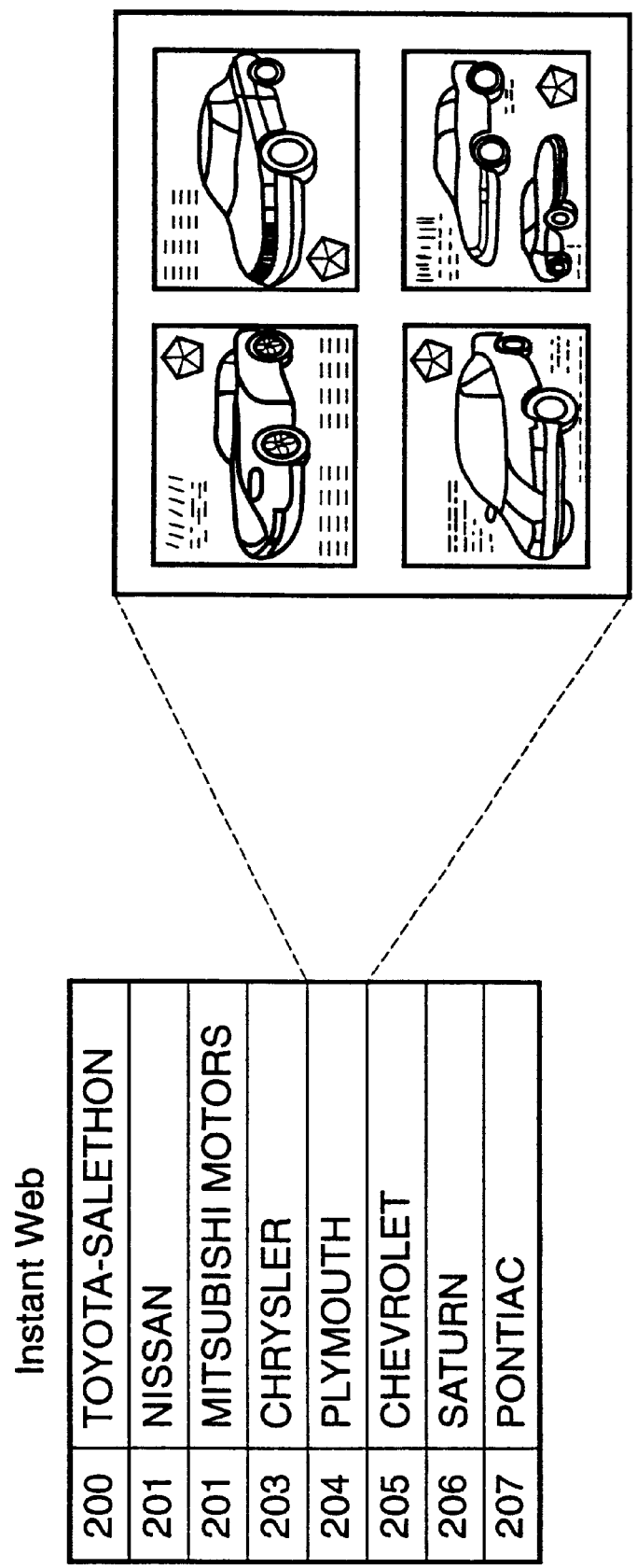
FIGS. 17 and 18 illustrate a channel advertising selection guide which references still images according to the present invention.

FIGS. 17 and 18—Advertising Channel Selection Guide

Referring now to FIG. 17, a diagram illustrating an advertising channel selection guide displayed on a user's television in the interactive television system of FIG. 1 according to one embodiment of the invention is shown. As shown, the selection guide may include a plurality of channels, such as channels 200–207. As shown, each of the channels are reserved for a respective advertiser. It is noted that the system of the present invention may be used for any of various types of advertising content as desired.

In the example of FIG. 17, each channel is reserved for a special auto manufacturer, e.g., channel 200 is reserved for a Toyota Sale-A-Thon, channel 201 is reserved for Nissan, channel 202 is reserved for Mitsubishi Motors, channel 203 is reserved for Chrysler Corporation, channel 204 is reserved for Plymouth, channel 205 is reserved for Chevrolet, channel 206 is reserved for Saturn, and channel 207 is reserved for Pontiac, etc. As discussed further below, each of the names beside the respective channels in FIG. 17 are hyperlinked to one or more corresponding MPEG stills. These MPEG stills are preferably being continuously broadcast on a channel reserved for this purpose, as described above. In other words, when a user selects a respective channel or respective advertiser, MPEG stills which include other advertising content of the respective advertiser are captured and displayed.

Referring now to FIG. 18, a diagram illustrating the web-like capabilities of the interactive television system of the present invention is shown. As shown, when the user selects a respective channel or respective advertising which includes interactive program according the invention, the decoder 140 displays the corresponding still image. The still image may comprise one or more thumbprint images or stills as well as one or more user selection options.

As shown in FIG. 18, when user selects the channel 203 and/or selects Chrysler, an image is displayed which includes one or more thumbprints of stills which the user may select and view, as well as one or more possible options. The thumbprints may be selected to view a full size image of the respective thumbprint. Thus, when one of the thumbprints is selected, the corresponding MPEG still, which is continuously being transferred by the interactive television broadcast system, is captured and stored in the memory of the decoder 140, and this still image is displayed on the user's television.

In the example of FIG. 18, the options shown in the hyperlink page comprise a send brochure option, and an exit option. The "send brochure" option may be selected for the user to indicate the desire to receive a brochure on the automobiles displayed in the respective image. The exit option may also be selected to return to the main channel selection menu shown in FIG. 17. The frame may also include an option to see additional pages with additional thumbprint images or other user options for viewing as desired.

Thus, the user may easily navigate among different advertisers and different advertising content using an Internet-based or web-based methodology in an interactive television system. This provides a more simplified mechanism for displaying interactive advertising content, as well as a simplified mechanism for enabling the user to navigate through interactive advertising content in an interactive television system.

FIGS. 19—Sweepstakes Example

FIG. 19 illustrates an example where an MPEG still image is used to provide advertising and/or an entry form for a sweepstakes or contest. As shown, FIG. 19 illustrates an MPEG still which comprises a sweepstakes entry form which can be filled out by the user or viewer. The information entered by the viewer on the still image form is then transmitted by the interactive decoder 140 to the transaction server 160 to enter the viewer in the sweepstakes.

FIG. 20—Magazine Subscription Example

FIG. 20 illustrates an example where an MPEG still image is used to provide advertising regarding magazine subscriptions. As shown, FIG. 19 illustrates an MPEG still which shows a number of possible magazine subscriptions. The MPEG still shown in FIG. 20 preferably includes a plurality of thumbprints which show the covers of magazines which may be ordered by the viewer of the interactive television system. The MPEG still in FIG. 20 also includes a "more" selection which allows the user to advance to another MPEG still which shows other magazine subscription options. Each of the thumbprint images in FIG. 20 may be selected to view a full-size image of a respective magazine as well as an option to order the respective magazine. When the user orders a respective subscription, information is provided from the MPEG decoder to the transaction server 160 to order the respective magazine for the user.

FIGS. 21—24: Information Data Feeds

FIGS. 21–24 illustrate use of the interactive television system of the present invention to selectively provide various data fees to a number of users. In this embodiment, one or more channels are reserved solely for MPEG stills that are related to data fees which may be desired by viewers. The first MPEG still which is displayed may show a desktop which includes sports, news, and stock points. Each of these selections in turn references further MPEG stills as shown in FIGS. 22–24 for sports, news, and stock information, as shown.

The interactive television system of the present invention thus enables a user to subscribe to a form of video content, such as a magazine, i.e., Sports Illustrated, Wired, etc., as opposed to subscribing to two channels of traditional broadcast programming. Thus, for example, the interactive television system provider may charge a first certain amount of money per subscriber per month per channel to allow the prospective provider to provide advertising content through the interactive television system.

Still Image Bandwidth

In the preferred embodiment, the compressed video stills are preferably MPEG still, preferably MPEG-2 compressed video stills. Also, in the preferred embodiment, the interactive television System includes a 4 Megabit per second (Mbit/sec) channel and transfer rate, which is equivalent to 0.5 Mbit/sec of data transfer. Each MPEG-2 compressed still image preferably comprises approximately 20 kilobytes. Thus, the interactive television system in the preferred embodiment is capable of transferring 25 still images per second. In other words, 0.5 Mbit/sec divided by 20 kilobyte/still image equals 25 still images per second. In the preferred embodiment of the present invention, the interactive television delivery broadcast system includes a carousel of images with a 3 second maximum latency. Assuming a 3 second maximum latency, the system of the present invention preferably stores and delivers up to 75 different images. This may correspond to, for example, 25 advertisers, each with 3 hyperlinked pages. Each of the users or viewers has full-time access to each of these pages through a channel guide with hyperlinks to the various advertisement as described above.

In an alternate embodiment of the present invention, interactive television system includes an 8 second latency. In this embodiment, the system stores a possible 400 different images, wherein these images may be assigned, for example, as four pages per advertiser for 100 advertisers. As mentioned above, each compressed video image comprises 20 kilobytes per still image, thus, 4 times 20 kilobytes is 80 kilobytes for each advertiser, times 100 advertisers equals 8 megabytes.

Conclusion

Therefore, the present invention comprises and improved system and method for providing interactive web like content in an interactive television system. The system and method of the present invention dedicates one or more channels for transferring MPEG stills and utilizes hyperlinks to enable users to navigate within these stills in a similar manner to an Internet web page. Selections are hyperlinked to respective MPEG compressed video stills which provide further content or information. The MPEG stills may further include interactive programming which provides options for the user to select more information or purchase products as desired.

What is claimed is:

1. A method for displaying still video images related to video content in an interactive television system, wherein the interactive television system comprises a video delivery system for providing video content, and at least one subscriber television including a display screen, wherein the subscriber television is coupled to the video delivery system, the method comprising:

the video delivery system providing one or more channels comprising video content;

the subscriber television receiving said one or more channels comprising video content;

the video delivery system providing at least one channel comprising a plurality of still video images;

the subscriber television receiving said at least one channel comprising said plurality of still video images;

displaying on the screen video content from one of said one or more channels comprising video content;

displaying on the screen one or more selection options, wherein each of said one or more selection options corresponds to one of said still video images;

receiving user input selecting a first selection of said one or more selection options; and wherein in response to said receiving said user input selecting said first selection of said one or more selection options the method further comprises capturing from said still video image channel and displaying on the screen a first one of said still video images corresponding to said first selection.

2. The method of claim 1, wherein said displaying on the screen video content comprises displaying on the screen said video content of a first television channel; and wherein the video delivery system provides said at least one channel comprising said plurality of still video images on a second television channel different than said first television channel.

3. The method of claim 2, wherein said displaying on the screen said first one of said still video images corresponding to said first selection comprises displaying said first one of said still video images on said second television channel in addition to said video content on said first television channel.

4. The method of claim 1, wherein said displaying on the screen said one or more selection options is performed during said displaying on the screen said video content.

5. The method of claim 1, wherein said displaying on the screen said first still video image corresponding to said first selection includes displaying on the screen a second set of selection options, wherein each of said second set of selection options corresponds to one of said still video images.

6. The method of claim 1, firer comprising:

the video delivery system providing a first channel comprising first video content;

the subscriber television receiving said first channel comprising said first video content;

displaying on the screen said first video content during a first period of time on said first channel;

the video delivery system providing one or more first still video images on said at least one channel during at least a portion of said first period of time, wherein said one or more first still video images correspond to said first video content.

7. The method of claim 6, wherein the video delivery system provides said one or more first still video images on said at least one channel at a greater rate during said at least a portion of said first period of time than at other than said first period of time.

8. The method of claim 1, wherein said still video images are compressed still video images;

wherein the video delivery system providing at least one channel comprising a plurality of still video images comprises the video delivery system providing at least one channel comprising a plurality of compressed still video images;

wherein the subscriber television receiving said at least one channel comprising said plurality of still video images comprises the subscriber television receiving said at least one channel comprising said plurality of compressed still video images.

9. The method of claim 1, wherein said displaying on the screen one or more selection options comprises displaying an electronic program guide.

10. The method of claim 1, wherein the system further comprises a media server which stores a plurality of still images, the method further comprising:

receiving user input indicating a request to receive additional still video images related to a video content;

the subscriber television providing said request to the media server;

the media server receiving said request;

the media server providing one or more additional still video images related to said video content on a third channel in response to receiving said request; and the subscriber television displaying on the screen said one or more additional still video images related to said video content.

11. The method of claim 10, wherein said media server is an Internet server for providing video content on the Internet.

12. The method of claim 1, further comprising:

displaying on the screen said video content in an inset window during said displaying on the screen said first still video image.

13. An interactive television system which displays still video images related to video content, the system comprising:

a video delivery system for providing a plurality of channels including at least one video channel and at least one still image channel, said at least one video channel comprising video content and said at least one still image channel comprising a plurality of still video images;

at least one subscriber television including a display screen, wherein the subscriber television is coupled to the video delivery system, wherein the subscriber television receives said plurality of channels and displays video content from said at least one video channel;

wherein said subscriber television is adapted to display one or more selection options during display of video content, wherein each of said one or more selection options corresponds to one of said still video images;

wherein said subscriber television is adapted to receive user input selecting one of said one or more selection options;

wherein in response to receiving said user input, said subscriber television is adapted to capture one of said still video images corresponding to said one of said one or more selection options and to display said one of said still video images.

14. The interactive television system of claim 13, wherein said subscriber television is adapted to display first video content during a first period of time;

wherein the video delivery system is adapted to provide one or more first still video images on said still image channel during at least a portion of said first period of time, wherein said one or more first still video images correspond to said first video content.

15. The interactive television system of claim 14, wherein the video delivery system provides said one or more first still video images on said still image channel at a greater rate during said at least a portion of said first period of time than at other than said first period of time.

16. The interactive television system of claim 13, further comprising:

a media server which stores a plurality of still images and which is adapted to provide still images in response to a request;

wherein the subscriber television is adapted to receive user input indicating a request to receive additional still video images related to a video content and to provide said request to the media server;

wherein the media server provides one or more additional still video images related to said video content on a channel in response to receiving said request; and wherein the subscriber television is adapted to display said one or more additional still video images related to said video content.

17. The interactive television system of claim 16, wherein said media server is an Internet server for providing video content on the Internet.

18. The interactive television system of claim 13, wherein said subscriber television further comprises a cache storage and wherein in response to receiving said user input, said subscriber television is adapted to capture one or more additional ones of said still video images which are related to said one of said still video images and to store said one or more additional ones of said still video images in said cache storage.

19. An interactive television system which displays still video images related to video content, the system comprising:

a subscriber television including a display screen, wherein the subscriber television receives a plurality of channels each comprising video content and displays video content from one of said plurality of channels, wherein said subscriber television also receives at least one channel comprising a plurality of still video images;

wherein said subscriber television is adapted to display one or more selection options during display of video content, wherein each of said one or more selection options corresponds to one of said still video images;

wherein said subscriber television is adapted to receive user input selecting one of said one or more selection options;

wherein said subscriber television is adapted to display a still video image corresponding to a user selection in response to receiving user input selecting one of said one or more selection options.

20. The interactive television system of claim 19, wherein the subscriber television is adapted for coupling to a video delivery system.

* * * * *

UNITED STATES PATENT AND TRADEMARK OFFICE
CERTIFICATE OF CORRECTION

PATENT NO. : 6,275,989 B1  
DATED : August 14, 2001  
INVENTOR(S) : Broadwin et al.

It is certified that error appears in the above-identified patent and that said Letters Patent is hereby corrected as shown below:

<u>Title page,</u>  
Item [73], please add -- Sun Microsystems, Inc., Palo Alto, CA --.

Signed and Sealed this

Fifteenth Day of October, 2002

*Attest:*

JAMES E. ROGAN  
*Attesting Officer*   *Director of the United States Patent and Trademark Office*